United States Patent
Yumura

(10) Patent No.: US 9,318,768 B2
(45) Date of Patent: Apr. 19, 2016

(54) SHOVEL

(75) Inventor: Masanori Yumura, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 320 days.

(21) Appl. No.: 13/699,570

(22) PCT Filed: May 26, 2011

(86) PCT No.: PCT/JP2011/002942
§ 371 (c)(1),
(2), (4) Date: Nov. 21, 2012

(87) PCT Pub. No.: WO2011/148641
PCT Pub. Date: Dec. 1, 2011

(65) Prior Publication Data
US 2013/0065103 A1  Mar. 14, 2013

(30) Foreign Application Priority Data

May 26, 2010 (JP) .................................. 2010-120285
Mar. 3, 2011 (JP) .................................. 2011-046121

(51) Int. Cl.
*H01M 10/02* (2006.01)
*H01G 11/78* (2013.01)
(Continued)

(52) U.S. Cl.
CPC .............. *H01M 10/02* (2013.01); *E02F 9/0858* (2013.01); *E02F 9/2091* (2013.01); *H01G 2/08* (2013.01);
(Continued)

(58) Field of Classification Search
CPC ............ H01M 10/02; H01M 10/5016; H01M 10/4207; H01G 9/155; H01G 11/06; H01G 2/08; G01G 11/78
USPC ........... 429/120, 152, 153; 361/502, 522, 517
See application file for complete search history.

(56) References Cited

U.S. PATENT DOCUMENTS

2006/0222935 A1* 10/2006 Takahashi et al. ............. 429/142
2011/0289907 A1* 12/2011 Sugiyama ........................ 60/325
(Continued)

FOREIGN PATENT DOCUMENTS

JP           08-111244       *  8/1996
JP           2002-151365        5/2002
(Continued)

OTHER PUBLICATIONS

English Translation of JP2008123800.*
(Continued)

*Primary Examiner* — Stewart Fraser
(74) *Attorney, Agent, or Firm* — Squire Patton Boggs (US) LLP

(57) ABSTRACT

An upper rotating body is rotatably attached to a lower traveling body. An electricity storage module is mounted on the upper rotating body. The electricity storage module includes a plurality of electricity storage cells each having at least a pair of electrodes led out from the edges of a plate-like portion. The electricity storage cells are stacked in the thickness direction of the plate-like portions, and are connected in series by bringing the electrodes of the electricity storage cells adjacent to each other in the stack direction into contact with each other. At least some of the electrode pairs, each of which is comprised of a pair of electrodes in contact with each other, each have a bridge structure having the electrodes bent in a direction in which the electrodes approach each other and also having the outer surface of one electrode and the inner surface of the other electrode in contact with each other.

12 Claims, 28 Drawing Sheets

(51) Int. Cl.
*H01G 2/08* (2006.01)
*E02F 9/08* (2006.01)
*E02F 9/20* (2006.01)
*H01M 2/10* (2006.01)
*H01M 2/20* (2006.01)
*H01M 2/30* (2006.01)
*H01M 10/625* (2014.01)
*H01G 9/00* (2006.01)
*H01G 11/06* (2013.01)
*H01M 10/42* (2006.01)
*H01M 10/6563* (2014.01)
*H01M 10/647* (2014.01)
*H01M 10/6555* (2014.01)
*H01M 2/02* (2006.01)
*H01M 10/48* (2006.01)
*B60L 11/18* (2006.01)

(52) U.S. Cl.
CPC ............... *H01G 9/155* (2013.01); *H01G 11/06* (2013.01); *H01G 11/78* (2013.01); *H01M 2/1077* (2013.01); *H01M 2/1083* (2013.01); *H01M 2/206* (2013.01); *H01M 2/305* (2013.01); *H01M 10/4207* (2013.01); *H01M 10/5016* (2013.01); *H01M 10/625* (2015.04); *H01M 10/647* (2015.04); *H01M 10/6555* (2015.04); *H01M 10/6563* (2015.04); *B60L 11/1879* (2013.01); *H01M 2/0245* (2013.01); *H01M 10/486* (2013.01); *H01M 2220/20* (2013.01); *Y02E 60/13* (2013.01); *Y02T 10/705* (2013.01); *Y02T 10/7005* (2013.01); *Y02T 10/7022* (2013.01)

(56) References Cited

U.S. PATENT DOCUMENTS

2012/0094165 A1* 4/2012 Valencia et al. ............... 429/120
2012/0234613 A1* 9/2012 Miyatake .................... 180/65.1

FOREIGN PATENT DOCUMENTS

| | | |
|---|---|---|
| JP | 2003-187781 | 7/2003 |
| JP | 2003-272966 | 9/2003 |
| JP | 2005-268138 | 9/2005 |
| JP | 2006-66322 | 3/2006 |
| JP | 2006-185733 | 7/2006 |
| JP | 2006-338933 | 12/2006 |
| JP | 2008-123800 | 5/2008 |
| JP | 2008123800 A * | 5/2008 |
| JP | 2008-150945 | 7/2008 |
| JP | 2008-187047 | 8/2008 |
| JP | 2008-192471 | 8/2008 |
| JP | 2008-251263 | 10/2008 |
| WO | 2006/059434 | 6/2006 |
| WO | WO 2010/095639 * | 8/2010 |
| WO | WO 2010095639 A1 * | 8/2010 |
| WO | WO 2011/004330 * | 1/2011 |
| WO | 2011/070758 | 6/2011 |
| WO | WO 2011070758 * | 6/2011 |

OTHER PUBLICATIONS

International Search Report and Written Opinion corresponding to International Patent Application No. PCT/JP2011/002942 dated Mar. 26, 2010.

* cited by examiner

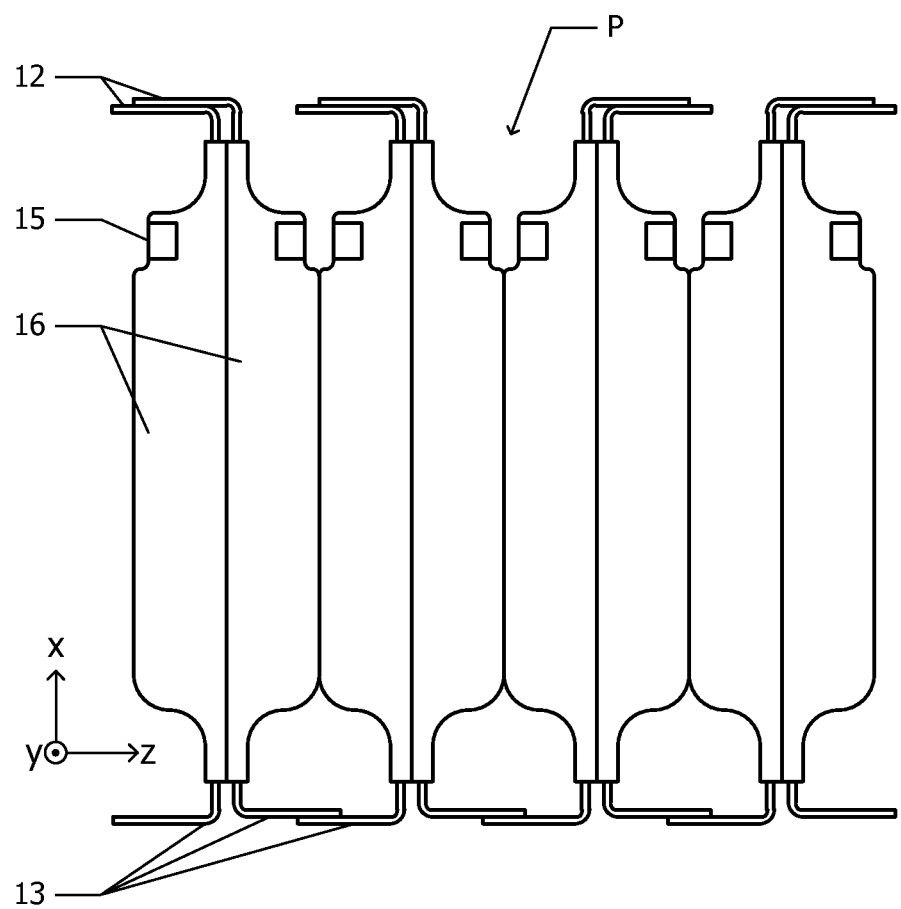

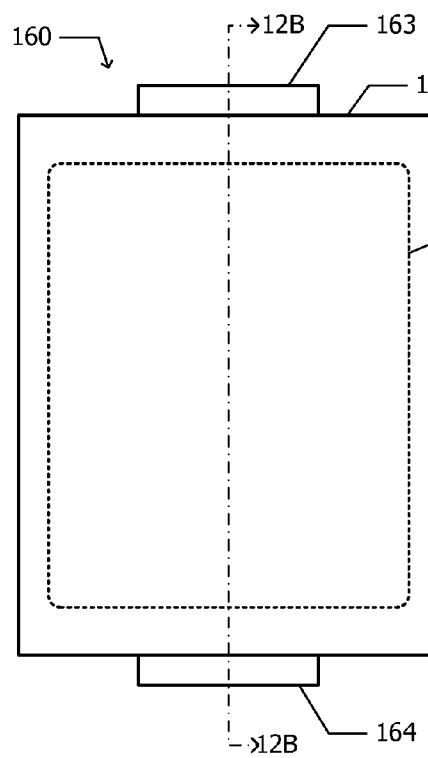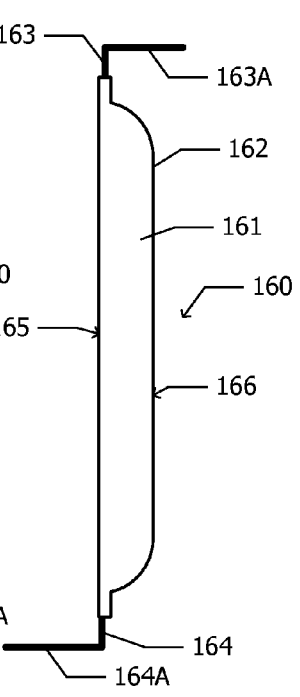
FIG. 12A  FIG. 12B  FIG. 12C

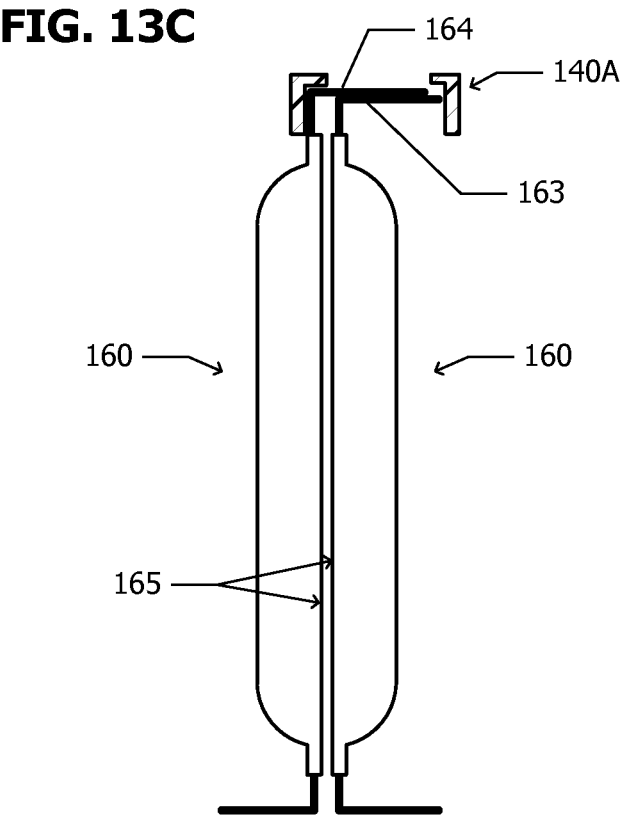

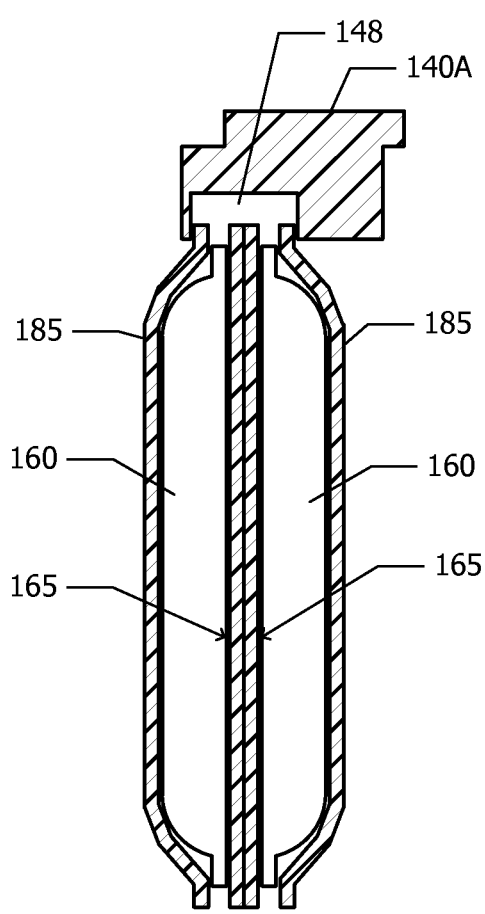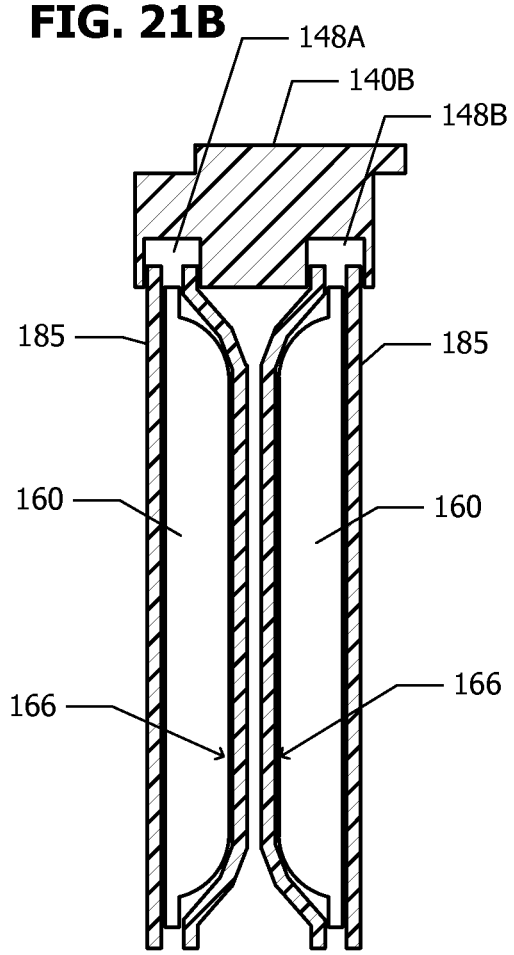

SHOVEL

TECHNICAL FIELD

The present invention relates to a shovel using an electricity storage module for an operating machine having a plurality of cells stacked therein.

BACKGROUND ART

Hybrid operating machines, for example, hybrid shovels using electricity storage cells, such as chargeable secondary cells or electric double layer capacitors, are being developed. Plate-like electricity storage cells in which an electricity storage element is wrapped with a film are proposed as electricity storage cells adopted for the hybrid operating machines. A positive electrode and a negative electrode are led out from an outer peripheral portion of an electricity storage cell.

An electricity storage module is formed by stacking and connecting a plurality of electricity storage cells in series. The electrodes of electricity storage cells adjacent to each other in the stack direction are electrically connected by welding, caulking, or the like. An electricity storage cell of the structure in which positive electrode plates and negative electrode plates are stacked via a separator and are sealed with a laminate film is proposed.

PRIOR ART DOCUMENTS

Patent Literature
[PTL 1] JP-A-2006-185733
[PTL 2] JP-A-2005-268138
[PTL 3] JP-A-2003-272966
[PTL 4] JP-A-2002-151365

SUMMARY OF THE INVENTION

Technical Problem to be Solved by the Invention

It is necessary to secure a space for connecting the electrodes by welding or caulking. In order to prevent short circuiting or discharge between the electrodes and other conductive portions, it is preferable that a portion connecting the electrodes be separated from other electrodes and the conductive portions to a certain degree. In order to reduce the size of the electricity storage module, it is desired to make the space for connecting the electrodes small.

An upper rotating body of a shovel includes a rotating frame as a supporting structure, and a cover that covers various parts mounted on the rotating frame. Since operating machines, such as the shovel, are mainly operated outdoors, it is preferable to take measures against water with respect to electrical components, such as the electricity storage module. In order to take measures against water, it is preferable that the electricity storage module be accommodated inside the cover. Since parts, such as a hydraulic pump and a rotating motor, are accommodated inside the cover of the shovel, it cannot be said that there is enough space to accommodate new parts. In order to accommodate the electricity storage module inside the cover, the reduction in size of the electricity storage module is desired.

Means of Solving the Problem

According to one aspect of the invention, there is provided a shovel comprising:

a lower traveling body;
an upper rotating body rotatably attached to the lower traveling body; and
an electricity storage module mounted on the upper rotating body,
wherein the electricity storage module includes a plurality of electricity storage cells each having at least a pair of electrodes led out from the edges of a plate-like portion,
wherein the electricity storage cells are stacked in the thickness direction of the plate-like portions, and are connected in series by bringing the electrodes of the electricity storage cells adjacent to each other in a stack direction into contact with each other, and
wherein at least some of electrode pairs, each of which is comprised of a pair of electrodes in contact with each other, each have a bridge structure having the electrodes bent in a direction in which the electrodes approach each other and also having the outer surface of one electrode and the inner surface of the other electrode in contact with each other.

Advantageous Effects of Invention

As the electrodes are bent in the direction in which the electrodes approach each other, the space occupied by the electrode can be made small. It is thereby possible to reduce the size of the electricity storage module.

BRIEF DESCRIPTION OF THE DRAWINGS

FIG. 6 is a schematic cross-sectional view of an electricity storage module according to Embodiment 5.

FIG. 12A is a plan view of the electricity storage cell used for the electricity storage module according to Embodiment 7, FIG. 12B is a cross-sectional view taken along one-dot chain line 12B-12B of FIG. 12A, and FIG. 12C is a cross-sectional view of an electricity storage cell having another structure.

FIG. 13C is a cross-sectional view of an electricity storage cell pair after ultrasonic welding is performed.

FIG. 21A is a cross-sectional view of electricity storage cells of which dorsal surfaces are made to face each other, the cladding films, and the first fixing member, and FIG. 21B is a cross-sectional view of electricity storage cells of which ventral surfaces are made to face each other, the cladding films, and the second fixing member.

DESCRIPTION OF EMBODIMENTS

[Embodiment 1]

Figure 1A:
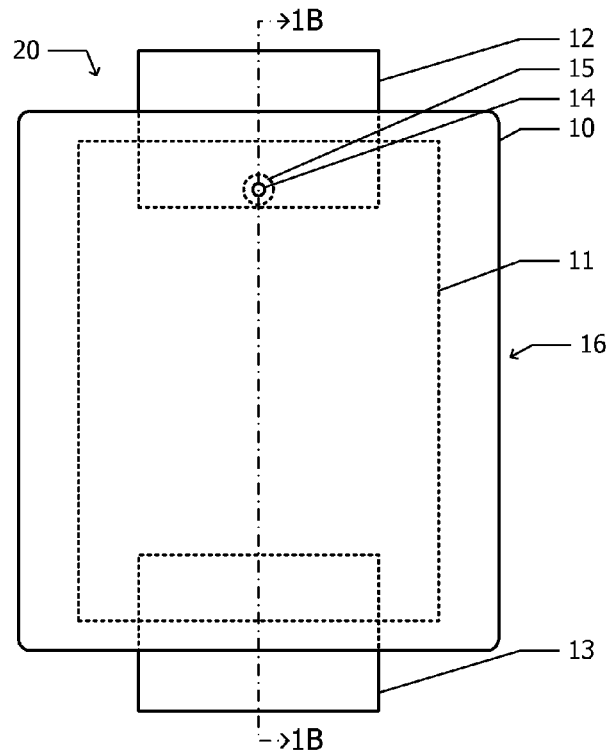
FIG. 1A is a plan view of an electricity storage cell used for an electricity storage module according to Embodiment 1.

FIG. 1A shows a plan view of an electricity storage cell 20 used for an electricity storage module according to Embodiment 1. An electricity storage cell 20 includes a plate-like portion 16 that has a function that stores electrical energy, and a first electrode 12 and a second electrode 13 that protrude in mutually opposite directions from the edges of the plate-like portion 16. The plate-like portion 16 includes an electricity storage element 11, and an electricity storage container 10 that accommodates the electricity storage element 11. The planar shape of the plate-like portion 16 is, for example, a rectangular shape in which apexes are slightly rounded.

The first electrode 12 and the second electrode 13 intersect the edges of the electricity storage container 10, and are led out from the inside of the electricity storage container 10 to the outside of the electricity storage container 10. The first electrode 12 and the second electrode 13 act as electrodes with mutually reverse polarities. The electricity storage container 10 is formed with a bleed hole 14. A bleed valve 15 is arranged at a position that overlaps the bleed hole 14.

Figure 1B:
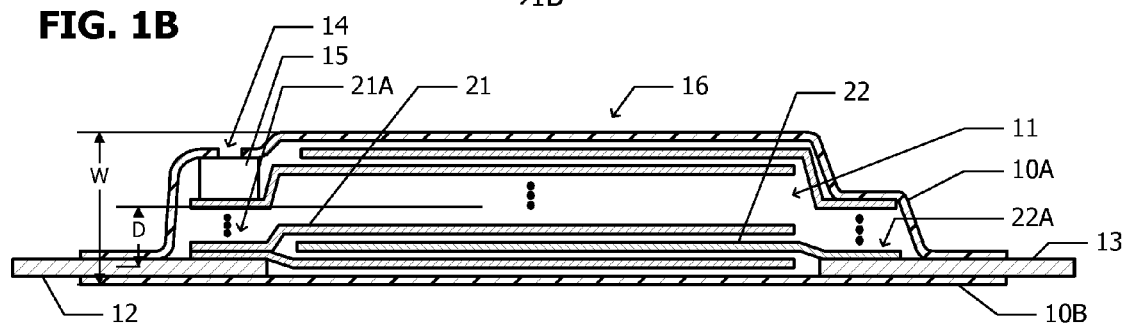
FIG. 1B is a cross-sectional view taken along a one-dot chain line 1B-1B of FIG. 1A.

FIG. 1B shows a cross-sectional view taken along a one-dot chain line 1B-1B of FIG. 1A. The electricity storage container 10 includes two aluminum laminate films 10A and 10B. The laminate films 10A and 10B sandwich the electricity storage element 11 therebetween, and seal the electricity storage element 11. One laminate film 10B is almost flat, and the other laminate film 10A is deformed reflecting the shape of the electricity storage element 11.

Figure 1C:
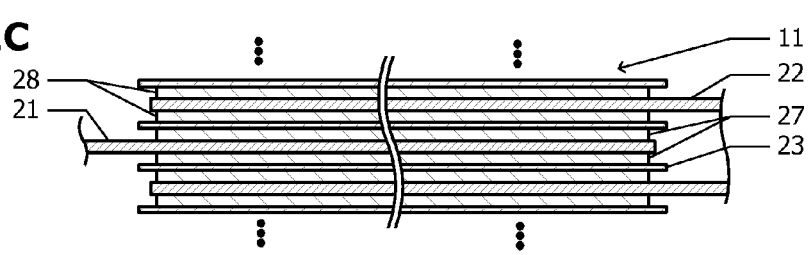
FIG. 1C is a partial cross-sectional view of the electricity storage element.

FIG. 1C shows a partial cross-sectional view of the electricity storage element 11. First polarizable electrodes 27 are formed on both surfaces of a first collector electrode 21, and second polarizable electrodes 28 are formed on both surfaces of a second collector electrode 22. Aluminum foil, for example, is used for the first collector electrode 21 and second collector electrode 22. The first polarizable electrodes 27 can be formed, for example, by applying slurry containing a binder, in which activated carbon particles are kneaded, to the surface of the first collector electrode 21, and then heating and fixing the applied slurry. The second polarizable electrodes 28 can also be formed by the same method.

The first collector electrode 21 having the first polarizable electrodes 27 formed on both surfaces thereof and the second collector electrode 22 having the second polarizable electrodes 28 formed on both surfaces thereof are alternately stacked. A separator 23 is arranged between the first polarizable electrode 27 and the second polarizable electrode 28. Cellulose paper, for example, is used for the separator 23. Electrolytic solution is impregnated into this cellulose paper. For example, a polarizable organic solvent, for example, propylene carbonate, ethylene carbonate, ethyl methyl carbonate, or the like is used for a solvent of the electrolyte. As the electrolyte (supporting salt), a quaternary ammonium salt, for example, SBPBF4 (spiro-bipyrrolidinium tetrafluoroborate) is used. The separator 23 prevents the short circuiting between the first polarizable electrode 27 and the second polarizable electrode 28, and the short circuiting between the first collector electrode 21 and the second collector electrode 22.

Returning to FIG. 1B, description will be continued. In FIG. 1B, description of the separator 23, the first polarizable electrode 27, and the second polarizable electrode 28 is omitted.

The first collector electrode 21 and second collector electrode 22 have extension portions 21A and 22A that extend in mutually opposite directions (left direction and right direction in FIG. 1B) from an overlapping region therebetween, respectively. The extension portions 21A of a plurality of the first collector electrodes 21 overlap each other, and are ultrasonically welded to the first electrode 12. The extension portions 22A of a plurality of the second collector electrodes 22 overlap each other, and are ultrasonically welded to the second electrode 13. Aluminum plates, for example, are used for the first electrode 12 and the second electrode 13.

The first electrode 12 and the second electrode 13 are led out to the outside of the electricity storage container 10 through the space between the laminate film 10A and the laminate film 10B. The first electrode 12 and the second electrode 13 are heat-welded to the laminate film 10A and the laminate film 10B in the led-out portions. Tab films may be sandwiched between the first electrode 12 and the laminate films 10A and 10B and between the second electrode 13 and the laminate films 10A and 10B. The tab films improve sealing strength.

The bleed valve 15 is arranged between the extension portion 21A of the first collector electrode 21, and the laminate film 10A. The bleed valve 15 is arranged so as to block the bleed hole 14, and is heat-welded to the laminate film 10A. The gas generated within the electricity storage container 10 is discharged to the outside through the bleed valve 15 and the bleed hole 14.

The inside of the electricity storage container 10 is evacuated. For this reason, the laminate films 10A and 10B are deformed by the atmospheric pressure so as to conform to the outer shape of the electricity storage element 11 and the bleed valve 15. The first electrode 12 and the second electrode 13 are attached to a position deviated closer to the laminate film 10B side than the center with respect the thickness direction of the electricity storage cell 20. This deviation amount is represented by D. The thickness of the electricity storage cell 20 is represented by W. In this specification, the surface of the laminate film 10B that is closer to being flatness is referred to "dorsal surface". The surface of the laminate film 10A that is deformed reflecting the outer shape of the electricity storage element 11 is referred to as "ventral surface".

Figure 2:
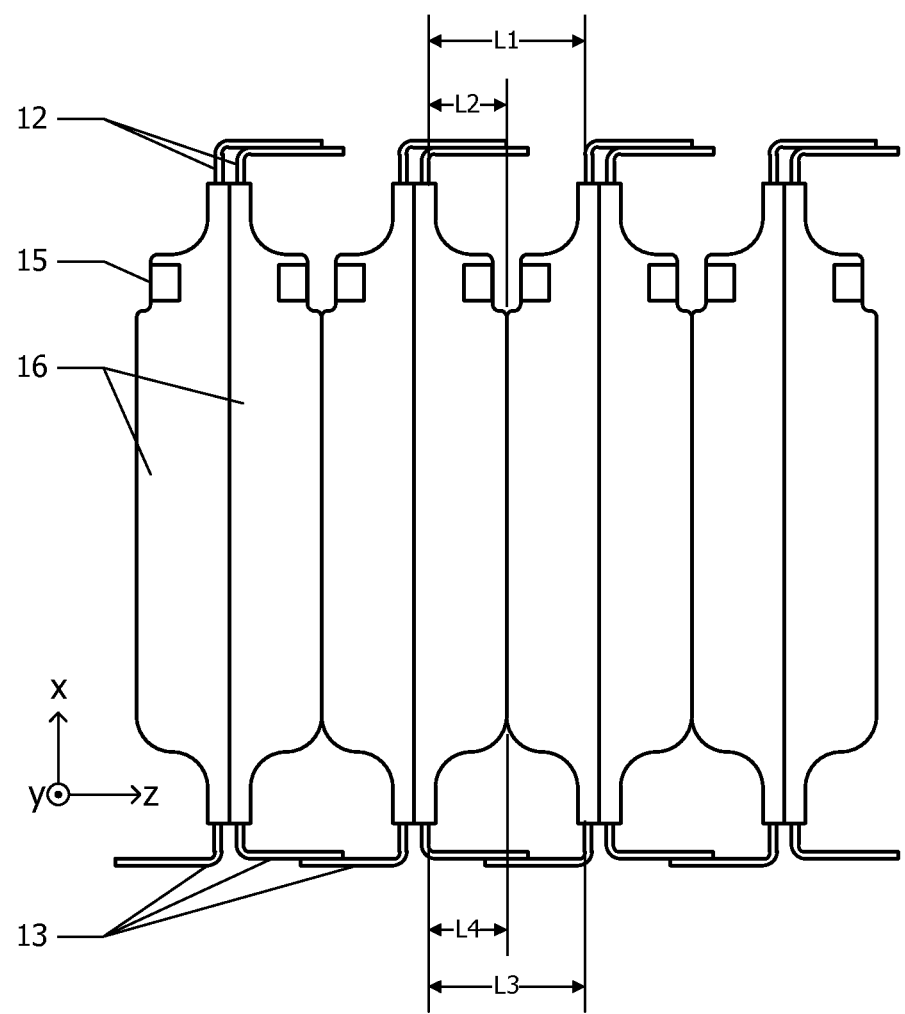
FIG. 2 is a schematic cross-sectional view of the electricity storage module according to Embodiment 1.

As shown in FIG. 2, a plurality of electricity storage cells 20 are stacked in the thickness direction thereof. A stack direction is defined as the z-direction in an xyz rectangular coordinate system. The electricity storage cells 20 adjacent to each other in the z-direction are stacked in an orientation where dorsal surfaces or ventral surfaces thereof face each other. In FIG. 2, when serial numbers 1, 2, 3, ... are given to the electricity storage cells 20 from left to right, an (2n)th electricity storage cell 20 and an (2n+1)th electricity storage cell 20 are arranged in an orientation where ventral surfaces thereof face each other and the (2n)th electricity storage cell 20 and (2n−1)th electricity storage cell 20 are arranged in an orientation where dorsal surfaces thereof face each other. Here, n is a positive integer.

Additionally, the electricity storage cells 20 are arranged in a posture where directions in which the first electrode 12 is viewed from the second electrode 13 face the same direction (positive direction of x). That is, in all the electricity storage cells 20, the bleed valves 15 are located on the positive side of the center of the electricity storage cell 20 in x-direction.

The electricity storage cells 20 of which dorsal surfaces are made to face each other are electrically connected by bringing the first electrodes 12 into contact with each other. The electricity storage cells 20 of which ventral surfaces are made to face each other are electrically connected by bringing the second electrodes 13 into contact with each other. Accordingly, the plurality of electricity storage cells 20 are connected in series. When the first electrode 12 and the second electrode 13 of one electricity storage cell 20 of the electricity storage cells 20 adjacent to each other in the z-direction act as a positive electrode and a negative electrode, respectively, contrary to this, the first electrode 12 and the second electrode 13 of the other electricity storage cell 20 act as a negative electrode and a positive electrode, respectively.

The first electrodes 12 of the two electricity storage cells 20 of which dorsal surfaces are made to face each other come into contact with each other in surfaces that face each other, and are anchored by ultrasonic welding, caulking, or the like. Moreover, the two anchored first electrodes 12 are bent in the direction of the z-axis. Such an anchoring structure is referred to as "L-shaped structure". The pair of electrodes that is anchored in the L-shaped structure is referred to as "electrode pair of the L-shaped structure". In Embodiment 1, all the electrode pairs of the L-shaped structure are bent in the same direction (positive direction in FIG. 2) of the z axis.

The second electrode 13 of the two electricity storage cells 20 of which ventral surfaces are made to face each other are bent in the direction in which the electrodes approach each other, and the outer surface of one second electrode 13 and the inner surface the other second electrode 13 are in contact with each other. The second electrodes 13 that come into contact with each other are anchored by ultrasonic welding, caulking, or the like. Such an anchoring structure is referred to as "bridge structure". The pair of electrodes that is anchored in the bridge structure is referred to as "electrode pair of the bridge structure".

In odd-numbered electricity storage cells 20 from the left of FIG. 2, the first electrodes 12 are bent to the dorsal surface side and the second electrodes 13 are bent to the ventral surface side. In even-numbered electricity storage cells 20, both the first electrodes 12 and the second electrodes 13 are bent to the ventral surface side. The anchoring of the electrodes may be performed after being bent or may be performed before being bent.

The distance L1 between the bases of the first electrodes 12 of the electricity storage cells 20 of which ventral surfaces are made to face each other is equal to twice the distance L2 from the base of the first electrode 12 to the ventral surface of the electricity storage cell 20 in the z-direction. For this reason, a large space for making the first electrodes 12 bent in the z-direction can be secured. By making the first electrodes 12 bent in the z-direction, an increase in the dimension of the electricity storage module in the x-direction can be suppressed. Thereby, since the size of the electricity storage module can be reduced, in a case where the module is adopted for a hybrid operating machine or an electrically driven operating machine, arrangement of the electricity storage module or restrictions on the layout of other parts can be reduced.

The distance L3 between the bases of the two second electrodes 13 of the electricity storage cells 20 of which ventral surfaces are made to face each other is equal to twice the distance L4 from the base of the second electrode 13 to the ventral surface of the electricity storage cell 20 in the z-direction. For this reason, a region (paste margin) where the second electrodes 13 are brought in contact with each other can be made to be large. Additionally, since the outer surface of one second electrode 13 and the inner surface the other second electrode 13 are brought into contact with each other, the dimension of the contact portion in the x-direction is equivalent to only the thickness of the two second electrodes 13.

In Embodiment 1, in portions closer to the tips than the bending positions, the first electrodes 12 are in contact with each other and the second electrodes 13 are in contact with each other. For this reason, both a plane where the first electrodes 12 are in contact with each other and a plane where the second electrodes 13 are in contact with each other are not parallel to the x-direction, and intersect the x-direction. In Embodiment 1, both a plane where the first electrodes 12 are in contact with each other and a plane where the second electrodes 13 are in contact with each other are almost perpendicular to the x-direction. For this reason, an increase in the dimension of the electricity storage module in the x-direction can be suppressed.

The gas generated inside the electricity storage cell 20 stagnates on the upper side. As the bleed valve 15 maintains a posture where the bleed valve is arranged above the center of the electricity storage cell 20, bleeding can be efficiently performed.

In FIG. 2, the electricity storage cells 20 of which dorsal surfaces are made to face each other are connected by the first electrodes 12, and the electricity storage cells 20 of which ventral surfaces are made to face each other are connected by the second electrodes 13. As another configuration example, the electricity storage cells 20 of which dorsal surfaces are made to face each other may be connected by the second electrodes 13, and the electricity storage cells 20 of which ventral surfaces are made to face each other may be connected by the first electrodes 12. In this case, the bridge structure is applied to the anchoring between the first electrodes 12, and the L-shaped structure is applied to the anchoring between the second electrodes 13.

In a case where the deviation of the attachment position of the first electrode 12 and the second electrode 13 in the thickness direction (FIG. 1B) is small, sufficient effects due to the configuration of Embodiment 1 are not obtained. It is preferable that the deviation amount D shown in FIG. 1B be made equal to or larger than ¼ of the thickness W.

[Embodiment 2]

Figure 3A:
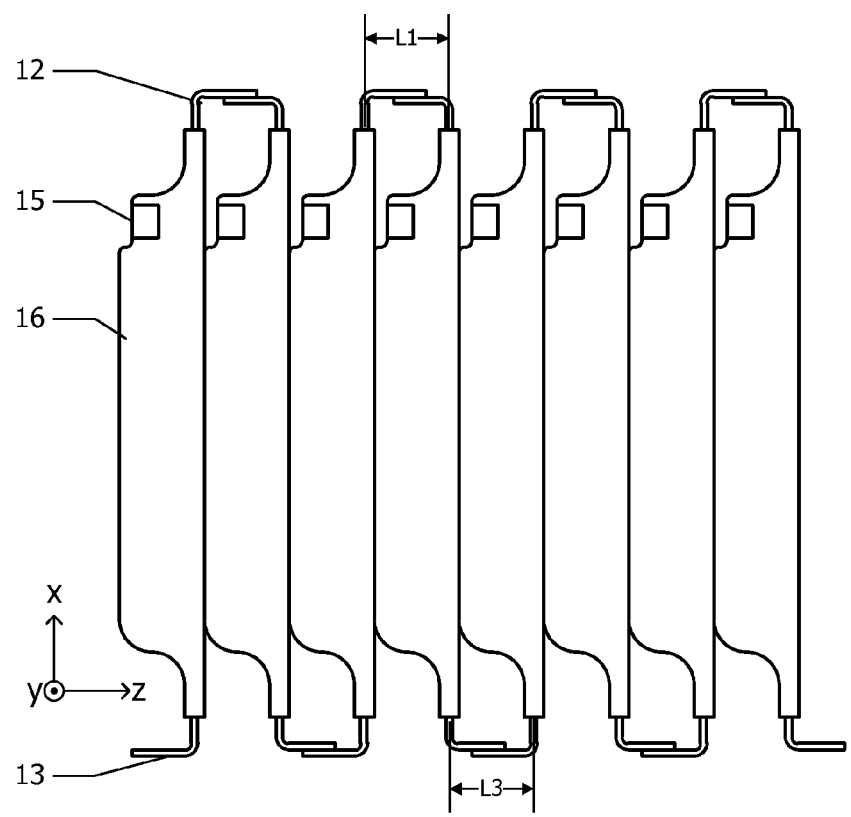
FIGS. 3A and 3B are schematic cross-sectional views of electricity storage modules according to Embodiment 2 and its modification, respectively.

FIG. 3A shows a schematic view of an electricity storage module according to Embodiment 2. In the following, attention will be paid to the differences from Embodiment 1 shown in FIG. 2, and description of the same configuration will be omitted. In Embodiment 2, all the electricity storage cells 20 are stacked in a posture where the ventral surfaces thereof face the same direction (for example, the negative direction of the z axis). The bridge structure is adopted for the connection between the first electrodes 12 and the connection between the second electrodes 13.

The distance L1 between the bases of the first electrodes 12 and the distance L3 between the bases of the second electrodes 13 are almost equal to the thickness of the plate-like portion 16 of the electricity storage cell 20. In the case of Embodiment 1, it is possible to make the dimension of the contact portion between the first electrodes 12 in the x-direction and the dimension of the contact portion between the second electrodes 13 in the x-direction greater than the thickness of the plate-like portion 16. In contrast, in Embodiment 2, the dimension of the contact portion between the first electrodes 12 in the x-direction and the dimension of the contact portion between the second electrodes 13 in the x-direction should be smaller than the thickness of the plate-like portion 16.

Even if the dimensions of the contact portions in the x-direction are made smaller than the thickness of the plate-like portion 16, it is also possible to adopt the structure of Embodiment 2 in a case where sufficient mechanical strength and electric connection can be secured. Even in Embodiment 2, the contact portion between the first electrodes 12 and the contact portion between the second electrodes 13 are almost parallel to a virtual plane perpendicular to the x-direction. For this reason, an increase in the dimension of the electricity storage module in the x-direction can be suppressed.

Figure 3B:
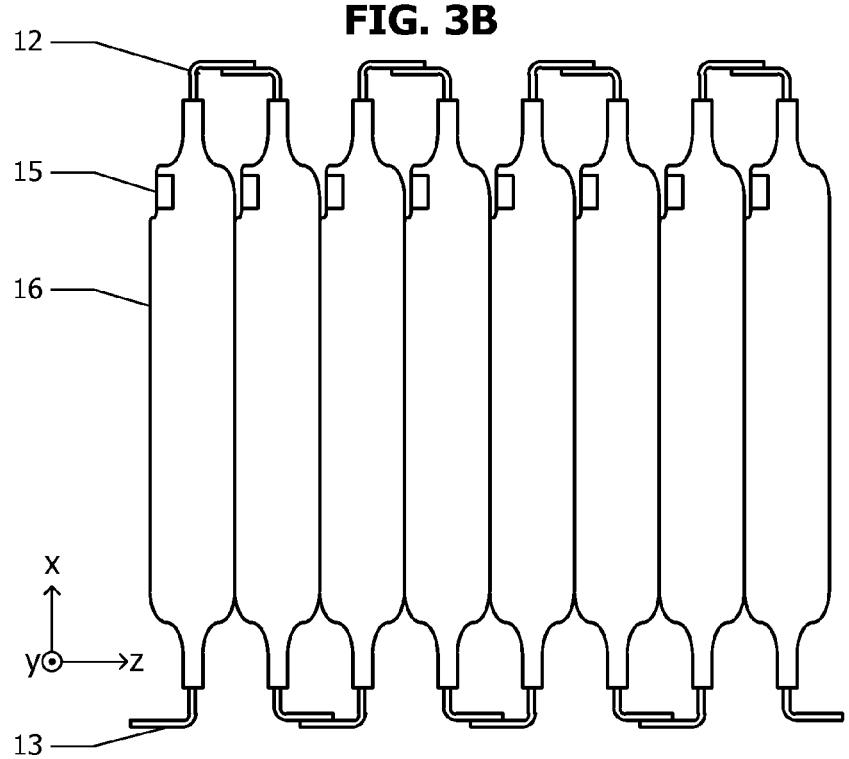

FIG. 3B shows a schematic view of an electricity storage module according to a modification of Embodiment 2. In Embodiment 2 shown in FIG. 3A, the base of the first electrode 12 and the base of the second electrode 13 are attached to portions closer to the dorsal surface side than the center of the plate-like portion 16 in the thickness direction. In the modification shown in FIG. 3B, the base of the first electrode 12 and the base of the second electrode 13 are attached to almost the center of the plate-like portion 16 in the thickness direction. That is, there is no distinction between the dorsal surface and the ventral surface in the electricity storage cell 20 used in this modification. In this way, the electrode pair of the bridge structure can also be applied to the connection between the electricity storage cells 20 that have no distinction between the dorsal surface and the ventral surface.

[Embodiment 3]

Figure 4A:
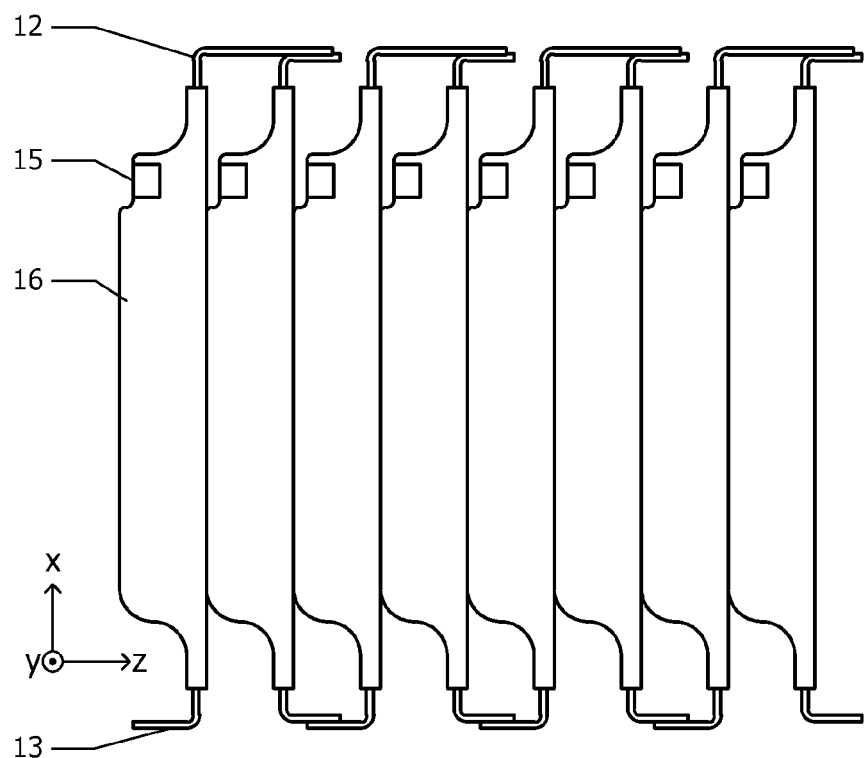
FIGS. 4A and 4B are schematic cross-sectional views of electricity storage modules according to Embodiment 3 and its modification, respectively.

FIG. 4 shows a schematic view of an electricity storage module according to Embodiment 3. In the following, attention will be paid to differences from Embodiment 2 shown in FIG. 3A, and description about the same configuration will be omitted.

Although Embodiment 2 adopts the bridge structure for both the connection between the first electrodes 12 and the connection between the second electrodes 13, the L-shaped structure is adopted for the connection between the first electrodes 12 in Embodiment 3. The dimension of the contact portion between the first electrodes 12 in the x-direction is smaller than the thickness of the plate-like portion 16. Even in the third Embodiment, similarly to Embodiment 2, an increase in the dimension of the electricity storage module in the x-direction can be suppressed. It is also possible to adopt the L-shaped structure for the connection between the second electrodes 13.

Figure 4B:
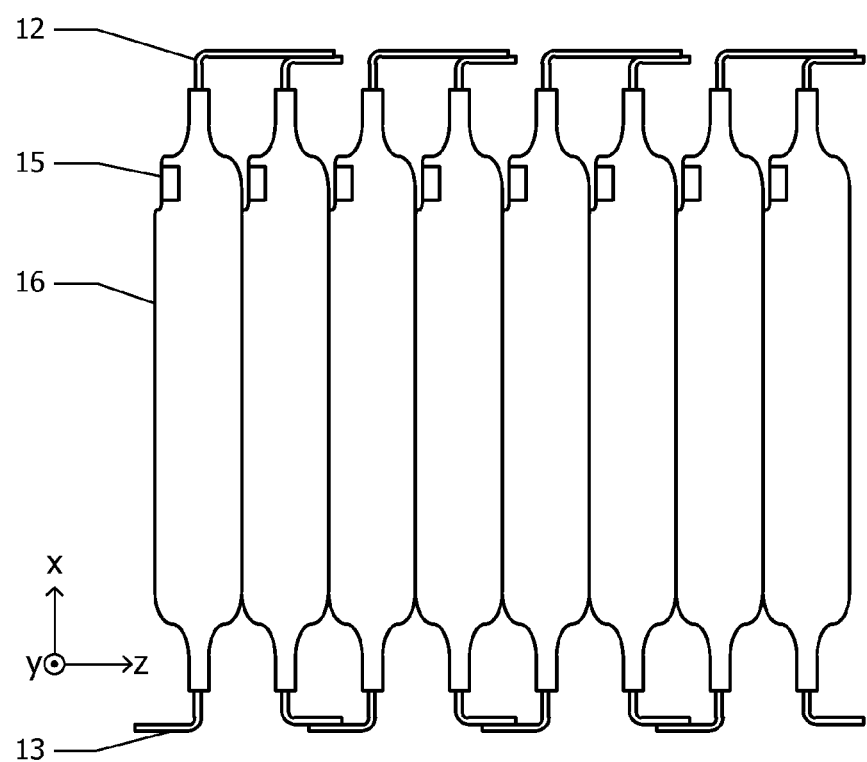

FIG. 4B shows a schematic view of an electricity storage module according to a modification of Embodiment 3. In this modification, the electricity storage cells 20 that have no distinction between the dorsal surface and the ventral surface shown in FIG. 3B is used. In this way, the electrode pair of the L-shaped structure can also be applied to the connection between the electricity storage cells 20 that have no distinction between the dorsal surface and the ventral surface.

[Embodiment 4]

Figure 5A:
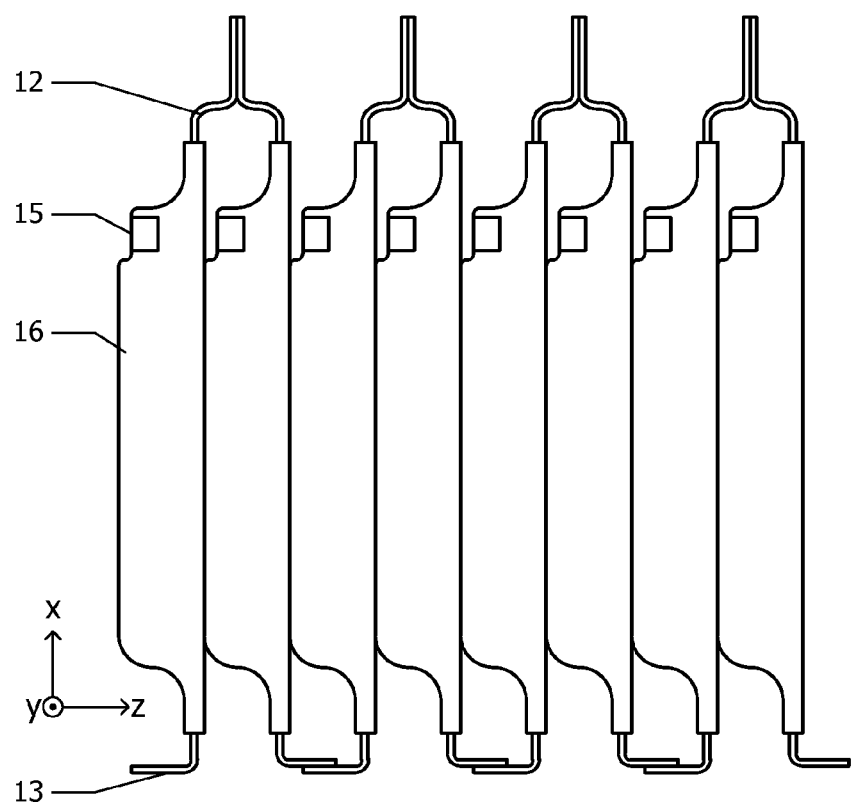
FIGS. 5A and 5B are schematic cross-sectional views of electricity storage modules according to Embodiment 4 and its modification, respectively.

FIG. 5A shows a schematic view of an electricity storage module according to Embodiment 4. In the following, attention will be paid to differences from Embodiment 2 shown in FIG. 3A, and description of the same configuration will be omitted.

Even in Embodiment 4, the bridge structure is adopted for the connection between the second electrodes 13. The first electrodes 12 are arranged such that the surfaces that face each other come into contact with each other and the contact portion is almost parallel to the xy plane. The respective first electrodes 12 are bent in the direction in which the first electrodes approach each other in the vicinity of the base thereof, and then bent in the direction away from the plate-like portions 16.

In Embodiment 4, the dimension of the first electrodes 12 in the x-direction becomes large compared to Embodiment 2 (FIG. 3A) that adopts the bridge structure and Embodiment 3 (FIG. 4A) that adopts the L-shaped structure, for the connection between the first electrodes 12. Even in this case, since the bridge structure is adopted for the connection between the second electrodes 13, the space for accommodating the second electrode 13 can be made small.

Figure 5B:
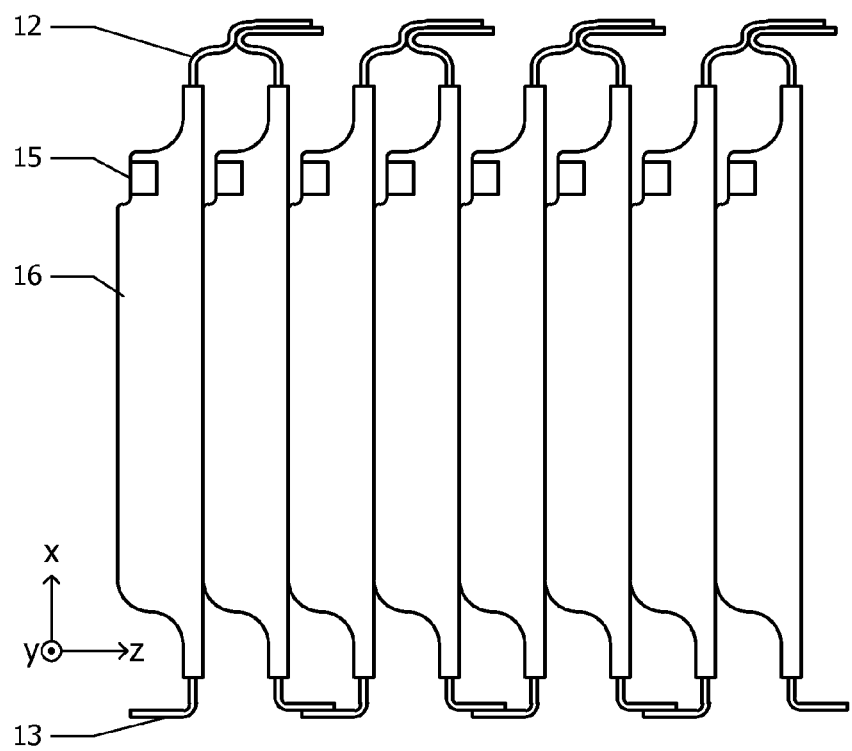

FIG. 5B shows a schematic view of an electricity storage module according to a modification of Embodiment 4. Although the contact portion of the first electrodes 12 is arranged almost parallel to the xy plane in the example shown in FIG. 5A, the contact portion of the first electrodes 12 is bent in the stack direction (z-direction) in the modification shown in FIG. 5B. FIG. 5B shows the example in which the contact portion is bent until the contact portion become almost parallel to the yz plane. The connection structure of the first electrodes 12 has the feature of the L-shaped structure in that the first electrodes come into contact with each other at the surfaces that face each other, and are bent in the z-direction, and has the feature of the bridge structure in that the first electrodes 12 are bent in the direction in which the first electrodes approach each other in the vicinity of the bases thereof. By making the contact portion of the first electrodes 12 bent in the stack direction, the space for accommodating the first electrodes 12 can be made small.

It is also possible to adopt the connection structure of the first electrodes 12 of FIG. 5B instead of the bridge structure as the connection structure of the second electrodes 13 shown in FIG. 2.

[Embodiment 5]

FIG. 6 shows a schematic view of an electricity storage module according to Embodiment 5. In the following, attention will be paid to differences from Embodiment 1 shown in FIG. 2, and description about the same configuration will be omitted.

In Embodiment 5, the first electrodes 12 that are anchored to each other are bent in the negative direction of the z axis on the negative side of a certain branch point P in the z-direction, and the first electrodes 12 that are anchored to each other are bent in the positive direction of the z axis on the positive side of the branch point P. That is, the first electrodes 12 on both sides of the branch point are bent in the directions away from each other.

As in Embodiment 5, the directions, in which the first electrodes 12 (electrode pair of the L-shaped structure) that are anchored to each other bend, are not necessarily aligned in all electrode pairs. However, if the first electrodes 12 (electrode pair of the L-shaped structure adjacent to each other) that are not anchored and are adjacent to each other are bent in the direction in which the first electrodes approach each other, both the electrodes come into contact with each other easily. It is preferable that the electrode pair of the L-shaped structure adjacent to each other be bent in the same direction of the z-direction or be bent in the directions away from each other.

[Embodiment 6]

Figure 7A:
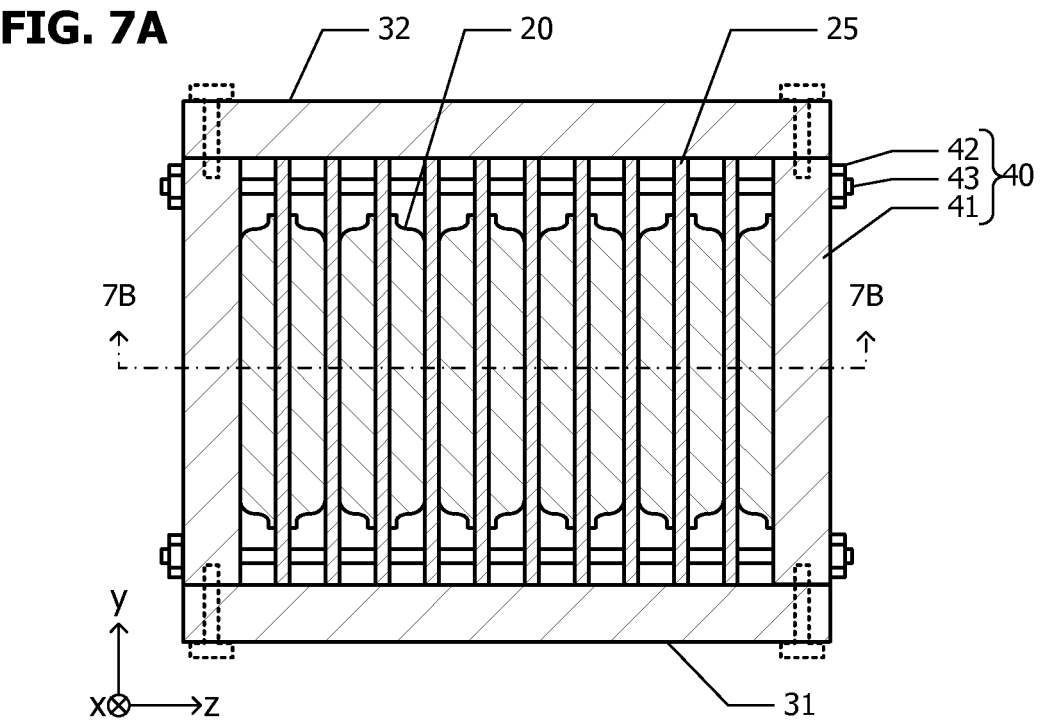
FIGS. 7A and 7B are cross-sectional views of an electricity storage module according to Embodiment 6.

FIG. 7A shows a cross-sectional view of an electricity storage module according to Embodiment 6. A plurality of electricity storage cells 20 are stacked in the thickness direction thereof. An xyz rectangular coordinate system in which the thickness direction (stack direction) of the electricity storage cells 20 corresponds to the direction of the z-axis, is defined. The configuration of the electricity storage cell 20 is the same as that shown in FIGS. 1A to 1C of Embodiment 1. The electricity storage cells 20 adjacent to each other in the z-direction, similarly to Embodiment 1, are stacked in an orientation where dorsal surfaces or ventral surfaces thereof face each other. A heat transfer plate 25 is arranged between the electricity storage cells 20 adjacent to each other in the z-direction.

Aluminum, for example, is used for the heat transfer plate 25. The heat transfer plate 25 spreads farther to the outside than the edge of the electricity storage cell 20 in the y-direction, that is, in the direction different from the direction (x-direction) in which the first electrode 12 and the second electrode 13 (FIG. 2) are led out.

A pressurizing mechanism 40 applies a compressive force in the stack direction (z-direction) to a stack including the electricity storage cells 20 and the heat transfer plates 25. The pressurizing mechanism 40 includes a pair of retainer plates 41, four tie-rods 43, and nuts 42. The retainer plates 41 are arranged on both ends of the stack including the electricity storage cells 20 and the heat transfer plates 25. The tie-rods 43 penetrate from one retainer plate 41 to the other retainer plates 41, and a force in the direction in which the interval between the pair of retainer plates 41 is narrowed is applied to both the retainer plates. The tie-rods 43 are arranged at positions where the tie-rods do not interfere spatially with the heat transfer plates 25 in the xy plane.

Wall plates 31 and 32 sandwich the stack including the electricity storage cells 20 and the heat transfer plates 25 therebetween in the y-direction. The wall plates 31 and 32 are arranged in a posture perpendicular to the y-axis, and are fixed to the retainer plates 41 with bolts. The wall plates 31 and 32 are thermally coupled to the heat transfer plates 25 at the end faces of the heat transfer plates 25. For example, the wall plates 31 and 32 and the heat transfer plate 25 may be directly brought into contact with each other, both may be fixed to each other with a thermally conductive adhesive, and a heat transmission rubber sheet may also be sandwiched between both. The heat generated in the electricity storage cells 20 is transferred to the wall plates 31 and 32 via the heat transfer plates 25. The temperature rise of the electricity storage cells 20 can be mitigated by forcedly cooling the wall plates 31 and 32 by water cooling or the like.

Figure 7B:
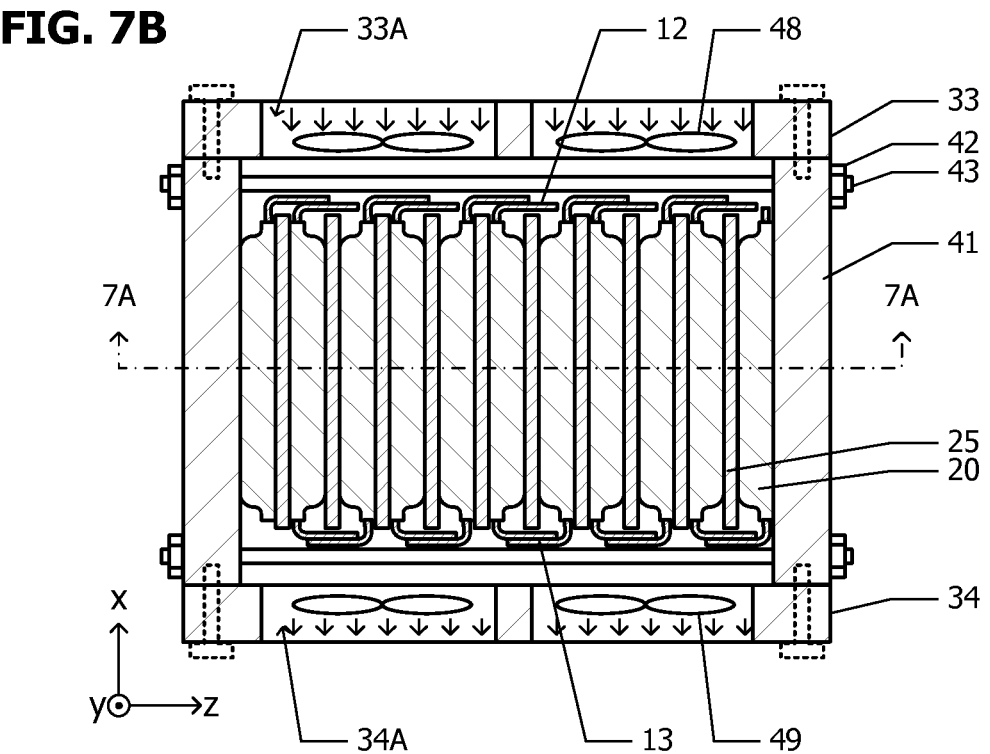

FIG. 7B shows a cross-sectional view taken along a one-dot chain line 7B-7B of FIG. 7A. The cross-sectional view taken along a one-dot chain line 7A-7A of FIG. 7B corresponds to FIG. 7A. A plurality of stacked electricity storage cells 20 are connected in series by the first electrodes 12 and the second electrodes 13. The anchoring structure of the first electrodes 12 and the anchoring structure of the second electrodes 13 are the same as those of Embodiment 1 shown in FIG. 2. The first electrodes 12 and the second electrodes 13 are bent so as not to come into contact with the heat transfer plates 25.

Wall plates 33 and 34 sandwich the stack including the electricity storage cells 20 and the heat transfer plates 25 therebetween in the x-direction. The wall plates 33 and 34 are fixed to the retainer plates 41 with bolts. Additionally, although not shown in FIG. 7B, the wall plates 33 and 34 are also fixed to the wall plates 31 and 32 (FIG. 7A) with bolts. The retainer plates 41 and the wall plates 31, 32, 33, and 34 constitute a parallelepiped housing.

Windows 33A and 34A are provided in wall plates 33 and 34, respectively. Forced air cooling devices 48 and 49 are arranged in the windows 33A and 34A, respectively. The forced air cooling devices 48 and 49 forcedly air-cools the inside of the housing.

The dimension of the housing in the x-direction can be made small by using the L-shaped structure as the anchoring structure of the first electrode 12 and using the bridge structure as the anchoring structure of the second electrode 13.

As described above, since the electricity storage cells 20 are pressurized with a predetermined pressure by the pressurizing mechanism 40, even if an impact is applied to the electricity storage module during the operation of an operating machine on which the electricity storage module is mounted, the electricity storage cells 20 does not easily deviate in the x-direction and the y-direction. Since the electrodes 12 and 13 do not separate even if an impact or vibration is generated in the operating machine, occurrence of malfunctions, such as poor conduction, can be prevented.

In Embodiment 6, as an example in which the electricity storage cells 20 are air-cooled, the forced air cooling devices 48 and 49 are arranged at the wall plates 33 and 34. However, it is also possible to liquid-cool the electricity storage cells 20. In this case, channels for coolant are formed inside the wall plates 31 and 32. The wall plates 31 and 32 can be cooled by flowing coolant through the channels. The heat generated in the electricity storage cells 20 is transmitted to the wall plates 31 and 32 via the heat transfer plates 25. It is thereby possible to efficiently cool the electricity storage cells 20.

The configuration of any of Embodiments 2 to 5 other than Embodiment 1 may be adopted as the posture of the electricity storage cells 20, the anchoring structure of the first electrodes 12, and the anchoring structure of the second electrodes 13.

[Embodiment 7]

Since a laminate film container that accommodates an electricity storage stack in which positive electrode plates, negative electrode plates, and separators are stacked is flexible, the container is not suitable for being used as a positioning reference during stacking of electricity storage cells. Additionally the relative position relationship between the electricity storage stack within the container and the laminate film varies in every electricity storage cell. For example, when electrodes are anchored to each other by overlapping two electricity storage cells, even if the laminate film is positioned with high precision, it cannot be said that the electricity storage stacks within the two electricity storage cells are positioned with high precision. If the number of electricity storage cells stacked increases, a positioning error may be accumulated and a large positional deviation may occur at both ends in the stack direction.

Additionally, when the electrodes are anchored by welding or the like in a state where the flexible laminate film is supported, the relative positions of the electrodes vary easily. For this reason, poor welding may occur. This problem is solved in Embodiment 7 to be described below.

Figure 8:
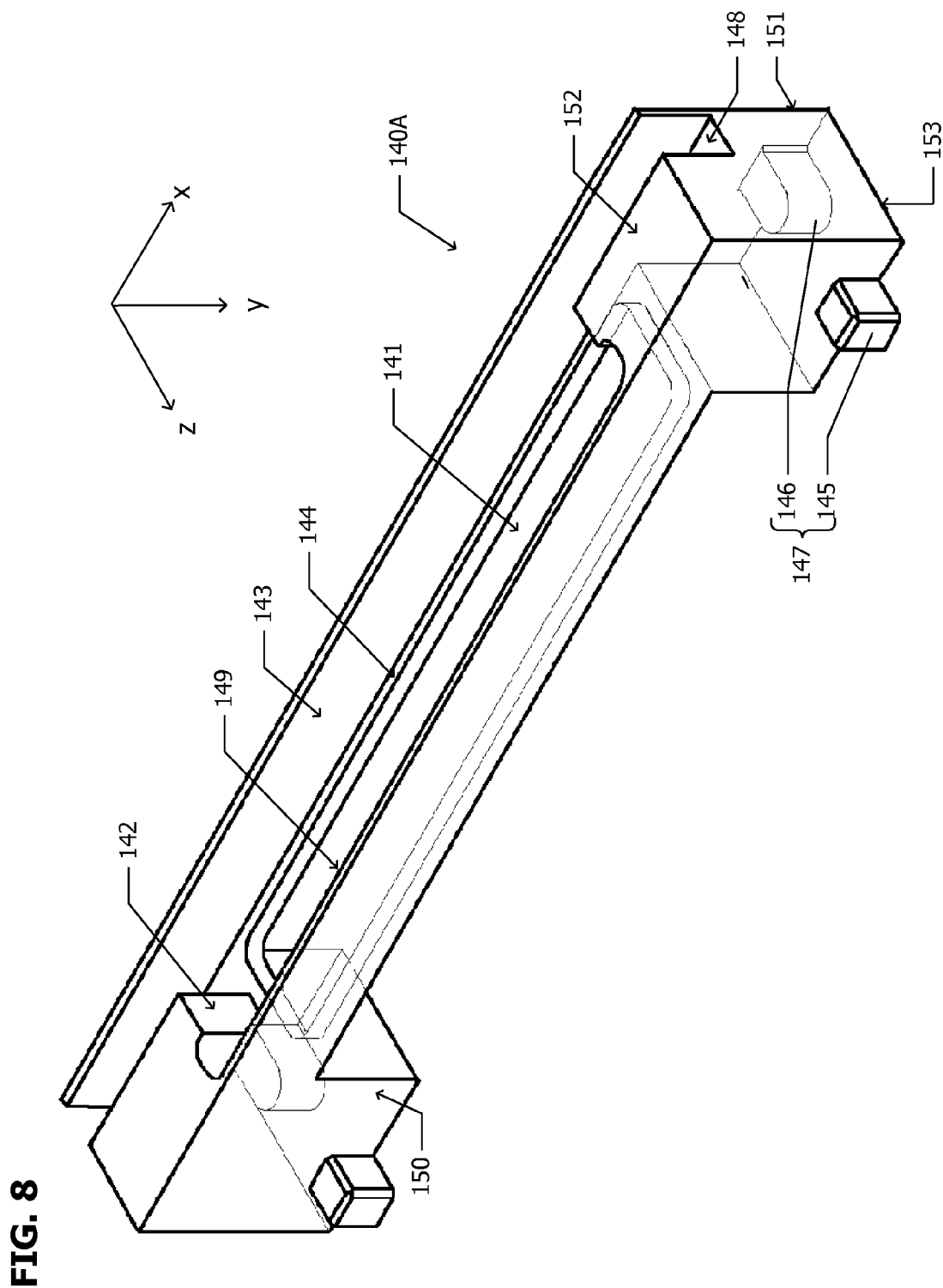
FIG. 8 is a perspective view of a first fixing member used for an electricity storage module according to Embodiment 7.

FIG. 8 shows a perspective view of a first fixing member 140A used for the electricity storage module according to Embodiment 7. In order to make the embodiment easily understood, an xyz rectangular coordinate system is defined, and the shape of the first fixing member 140A will be described. The positional relationship between the xyz rectangular coordinate system to be defined in Embodiment 7 and an electricity storage cell is not the same as the positional relationship between the xyz rectangular coordinate system (FIGS. 2 to 6, and FIGS. 7A and 7B) defined in Embodiments 1 to 6 and an electricity storage cell.

The surfaces of the first fixing member 140A that are perpendicular to the z axis and face the positive and negative directions of the z axis are referred to as front surface 150 and back surface 151, respectively, and the surfaces of the first fixing member 140A that are perpendicular to the y-axis and face the negative and positive directions of the y-axis are referred to bottom surface 152 and top surface 153, respectively. The first fixing member 140A is formed from insulating materials, such as polytetrafluoroethylene. In FIG. 8, the first fixing member 140A is drawn in a posture where the bottom surface 152 faces upward.

In the top surface 153, both ends in the x-direction are higher than the central portion. The low region of the top surface 153 is formed with an opening 141 that ranges from the bottom surface 152 to the top surface 153 and is elongated in the x-direction. The bottom surface 152 is formed with a groove 148 that extends in the x-direction. The groove 148 is arranged at a position deviated closer to the back surface 151 side than the midpoint between the front surface 150 and the back surface 151. The opening 141 and the groove 148 partially overlap each other in the zx plane. A lead-out electrode of an electricity storage cell is inserted into the opening 141 from the bottom surface 152 side. Here, the "lead-out electrode" is equivalent to the first electrode 12 (FIG. 2) of Embodiment 1.

First side surfaces 142 perpendicular to the x-axis are defined at both ends of the opening 141 in the x-direction, a second side surface 143 and a third side surface 149 perpendicular to the z axis are defined on the back surface 151 side and front surface 150 side of the opening 141, respectively. The second side surface 143 also serves as the side surface of the groove 148. A step 144 is formed at the side surfaces of the opening 141. The step 144 goes around the periphery of the opening 141 when viewed from a visual line parallel to the y-axis. When the lead-out electrode of the electricity storage cell is inserted in a state where the lead-out electrode is in contact with the first side surfaces 142 and the second side surface 143, the depth of insertion is regulated as a portion of the lead-out electrode gets into touch with the step 144.

The front surface 150 is formed with two protrusions 145 that protrude in the positive direction of the z axis, and the back surface 151 is formed with two recesses 146 that become deep in the positive direction of the z axis. The side surface of the protrusion 145 that faces the positive direction of the y-axis is continuous with the high region of the top surface 153 and forms one flat surface. The recess 146 has an apertuaral area also in the high region of the top surface 153.

When two first fixing members 140A having the same geometric shape are prepared and the front surface 150 of one first fixing member 140A is made to face the back surface 151 of the other first fixing member 140A, the protrusions 145 of one first fixing member 140A are inserted into the recesses 146 of the other first fixing member 140A. Thereby, the relative positional relationship of the two first fixing members 140A in the x-direction is constrained. The protrusion 145 and the recess 146 are referred to as a fitting portion 147.

Figure 9A:
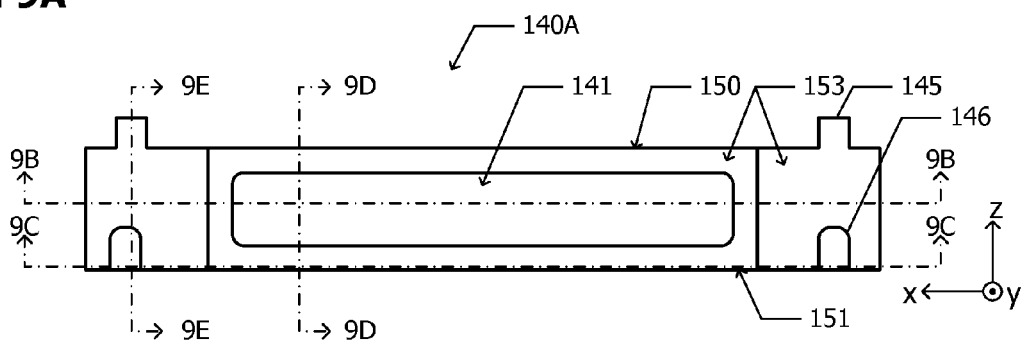
FIG. 9A is a plan view of the first fixing member.

FIG. 9A shows a plan view of the first fixing member 140A. Cross-sectional views taken along one-dot chain lines 9B-9B, 9C-9C, 9D-9D, and 9E-9E of FIG. 9A are respectively shown in FIGS. 9B, 9C, 9D, and 9E. FIG. 9C shows a cross-sectional view at a position closer to the back surface 151 side than the groove 148 (FIG. 8).

As shown in FIG. 9A, the opening 141 is formed in the low region of the top surface 153. The protrusions 145 protrude toward the positive direction of the z axis from the front surface 150. The recesses 146 are formed so as to become deep in the positive direction of the z axis from the back surface 151. The protrusions 145 and the recesses 146 are arranged at the same positions in the x-direction.

Figure 9B:
FIGS. 9B, 9C, 9D, and 9E are cross-sectional views taken along one-dot chain lines 9A-9A, 9B-9B, 9C-9C, and 9E-9E of FIG. 9A, respectively.
Figure 9C:
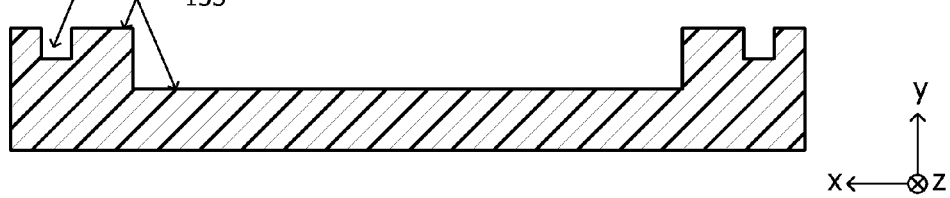

As shown in FIG. 9B, the step 144 is formed on the first side surfaces 142 of the opening 141. A riser surface of the step 144 faces the bottom surface 152 side (the negative direction of the y-axis). For this reason, if the lead-out electrode is inserted into the opening 141 from the bottom surface 152 side while maintaining a state where the lead-out electrode is brought into contact with the first side surfaces 142, the lead-out electrode gets into touch with the riser surface of the step 144.

As shown in FIG. 9C, the recesses 146 that becomes deep in the positive direction of the z axis from the back surface 151 (FIG. 9A) open also on the high region of the top surface 153.

Figure 9D:
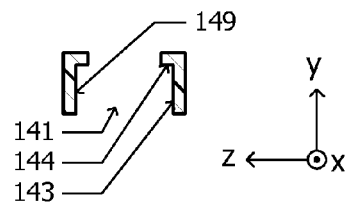

As shown in FIG. 9D, the second side surface 143 of an opening 141 is formed with the step 144. The third side surface 149 that faces the second side surface 143 is also formed with the step 144. The riser surface of the step 144 faces the negative direction of the y-axis. For this reason, if the lead-out electrode is inserted into the opening 141 from the bottom surface 152 side while maintaining a state where the lead-out electrode is brought into contact with the second side surface 143, the lead-out electrode gets into touch with the riser surface of the step 144. As shown in FIGS. 9B and 9D, as the lead-out electrode gets into touch with the step 144, the insertion depth of the lead-out electrode into the opening 141 can be easily maintained at a target depth.

Figure 9E:
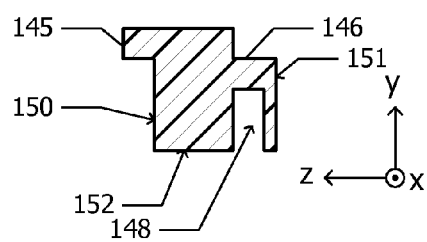

As shown in FIG. 9E, the protrusion 145 protrudes toward the positive direction of the z axis from the front surface 150. The recess 146 is formed so as to become deep in the positive direction of the z axis from the back surface 151. The protrusion 145 and the recess 146 are arranged at the same position (height) in the y-direction. The groove 148 is formed so as to become deep in the positive direction of the y axis from the bottom surface 152. The groove 148 is arranged at a position closer to the back surface 151 side than the intermediate position between the front surface 150 and the back surface 151.

Figure 10:
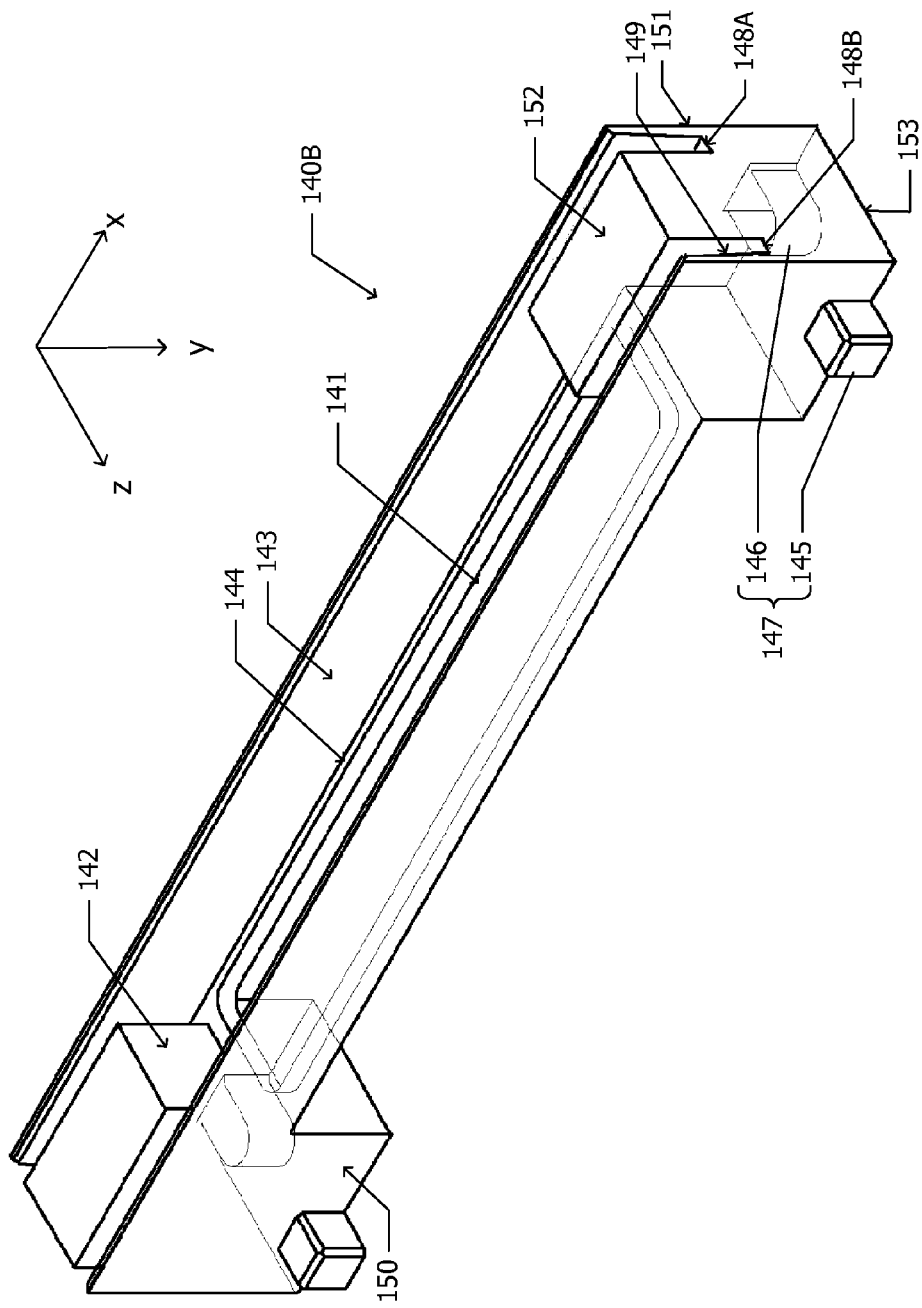
FIG. 10 is a perspective view of a second fixing member used for the electricity storage module according to Embodiment 7.

FIG. 10 shows a perspective view of a second fixing member 140B used for the electricity storage module according to Embodiment 7. In the following, differences from the first fixing member 140A shown in FIG. 8 will be described, and description of the same configuration will be omitted. In FIG. 10, similarly to FIG. 8, the second fixing member is drawn in a posture where the bottom surface 152 faces upward.

Although the first fixing member 140A is formed with one groove 148 (FIG. 8), the second fixing member 140B is formed with two grooves 148A and 148B. Each of the groove 148A and the groove 148B, similarly to the groove 148, is formed so as to become deep from the bottom surface 152 toward the top surface 153, and has a planar shape that is elongated in the x-direction. One groove 148A is arranged closer to the back surface 151 side than the intermediate position between the front surface 150 and the back surface 151, and the other groove 148B is arranged closer to the front surface 150 side than the intermediate position between the front surface 150 and the back surface 151. The width of the groove 148A and the groove 148B is smaller than the width of the groove 148 (FIG. 8) of the first fixing member 140A, and is about ½ of the width of the groove 148.

The grooves 148A and 148B partially overlap the opening 141 in the zx plane. A portion of the side surface of the groove 148A that faces the front surface 150 side also serves as the second side surface 143 of the opening 141. A portion of the side surface of the groove 148B that faces the back surface 151 side also serves as the third side surface 149 of the opening 141. A lead-out electrode of an electricity storage cell is inserted into the opening 141 from the bottom surface 152 side. Here, the "lead-out electrode" is equivalent to the second electrode 13 (FIG. 2) of Embodiment 1.

Figure 11A:
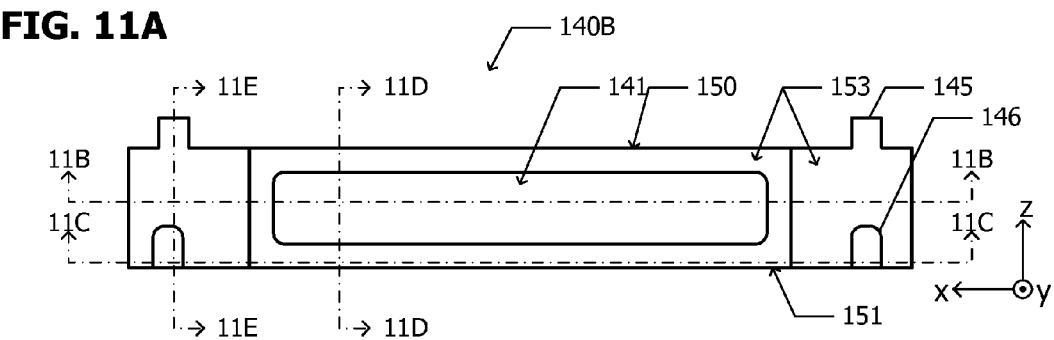
FIG. 11A is a plan view of the second fixing member.

FIG. 11A shows a plan view of the second fixing member 140B. Cross-sectional views taken along one-dot chain lines 11B-11B, 11C-11C, 11D-11D, and 11E-11E of FIG. 11A are respectively shown in FIGS. 11B, 11C, 11D, and 11E. FIG. 11C shows a cross-sectional view at a position closer to the back surface 151 side than the groove 148A (FIG. 10).

Figure 11B:
FIGS. 11B, 11C, 11D, and 11E are cross-sectional views taken along one-dot chain lines 11A-11A, 11B-11B, 11C-11C, and 11E-11E of FIG. 11A, respectively.
Figure 11C:
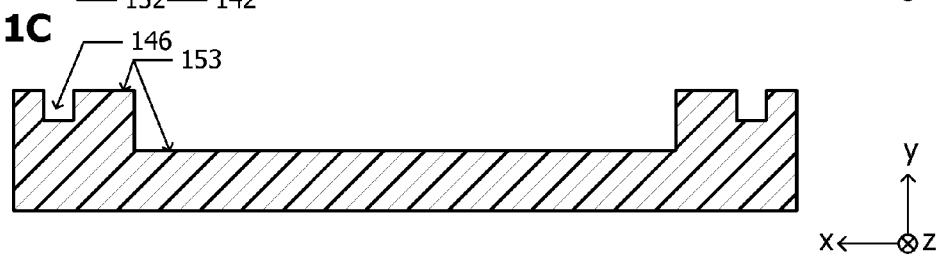
Figure 11D:
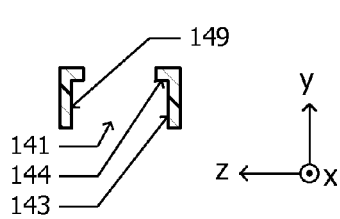
Figure 11E:
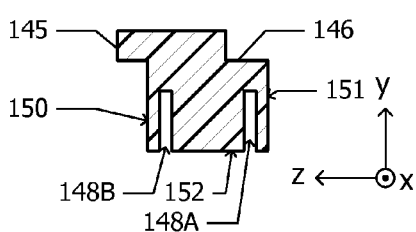

The planar shape shown in FIG. 11A and the cross-sectional shapes shown in FIGS. 11B to 11D are the same as the planar shape shown in FIG. 9A and the cross-sectional shapes shown in FIGS. 9B to 9D of the first fixing member 140A, respectively. As shown in FIG. 11E, the bottom surface 152 is formed with the two grooves 148A and 148B. One groove 148A is arranged closer to the back surface 151 side than the intermediate position between the front surface 150 and the back surface 151, and the other groove 148B is arranged closer to the front surface 150 side than the intermediate position between the front surface 150 and the back surface 151.

FIG. 12B shows a plan view of an electricity storage cell used for an electricity storage module according to Embodiment 7. An electricity storage stack 161 is accommodated in an electricity storage container 162. The electricity storage stack 161 and the electricity storage container 162 have a plate-like shape, and the planar shape thereof is substantially rectangular. The electricity storage stack 161 is an electric double layer capacitor, a lithium ion capacitor, or the like. The electricity storage stack 161 includes a plurality of positive electrode plates and negative electrode plates that are alternately stacked, and a separator inserted between the positive electrode plate and the negative electrode plate, and is equivalent to the electricity storage element 11 (FIGS. 1A to 1C) of Embodiment 1.

The plate-like lead-out electrodes 163 and 164 are respectively connected to the positive electrode plates and negative electrode plates of the electricity storage stack 161 and are led out to the outside of the electricity storage container 162. The lead-out electrodes 163 and 164 are led out in opposite directions from mutually opposite edges of the electricity storage container 162.

FIG. 12B shows a cross-sectional view taken along a one-dot chain line 12B-12B of FIG. 12A. The electricity storage container 162 is constituted by, for example, two aluminum laminate films. The two aluminum laminate films sandwiches the electricity storage stack 161, and the aluminum laminate films are welded to each other at the outer peripheral portions thereof. One surface of the electricity storage cell 160 is almost flat, and the other surface has a shape reflecting the outer shape of the electricity storage stack 161. The substantially flat surface of the electricity storage cell 160 is referred to as dorsal surface 165, and its opposite surface is referred to as ventral surface 166.

The lead-out electrodes 163 and 164 are led out along a virtual plane obtained by extending the dorsal surface 165 in the lead-out direction from a position deviated closer to the dorsal surface 165 side than the center of the electricity storage cell 160 in the thickness direction. Each of the lead-out electrodes 163 and 164 extend outward from the electricity storage container 162, and is then bent by about 90 degrees toward the ventral surface 166 side of the electricity storage cell 160 in the thickness direction (the stack direction). The portions of the lead-out electrodes 163 and 164 that are closer to the tip side than positions where the lead-out electrodes are bent are referred to as tip portions 163A and 164A, respectively.

FIG. 12C shows a cross-sectional view of another electricity storage cell 160 used for the electricity storage module according to Embodiment 7. In the electricity storage cell 160 shown in FIG. 12B, all of the lead-out electrodes 163 and 164 are bent to the ventral surface 166 side. In the electricity storage cell 160 shown in FIG. 12C, one lead-out electrode 163 is bent to the ventral surface 166 side, but the other lead-out electrode 164 is bent to the dorsal surface 165 side of the electricity storage cell 160 in the thickness direction (the stack direction). The electricity storage cell 160 shown in FIG. 12B is referred to as "forward type", and the electricity storage cell 160 shown in FIG. 12C is referred to as "opposite type".

One of the lead-out electrodes 163 and 164 corresponds to the first electrode 12 (FIG. 2) of Embodiment 1, and the other corresponds to the second electrode 13 (FIG. 12) of Embodiment 1.

In a case where the electricity storage cell 160 has polarity, for example, the lead-out electrode 163 serves as a positive electrode and the other lead-out electrode 164 serves as a negative electrode. In a case where the electricity storage cell 160 does not have polarity, it is not necessary to distinguish the lead-out electrodes 163 and 164.

Figure 13A:
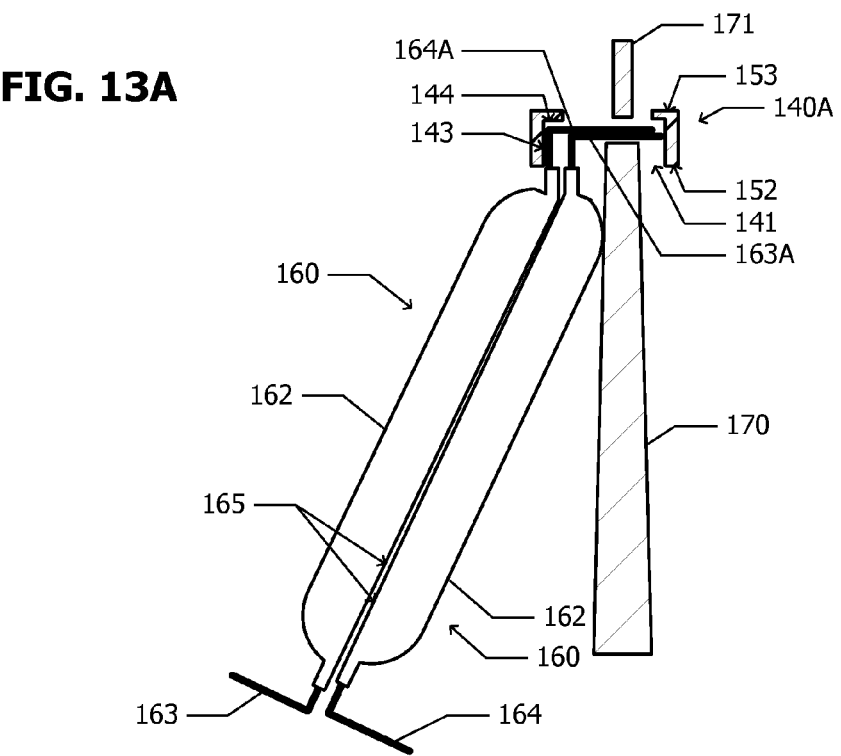
FIG. 13A is a schematic cross-sectional view of an electricity storage cell and an ultrasonic welder when ultrasonic welding of lead-out electrodes of the electricity storage cell is performed.

As shown in FIG. 13A, a forward type electricity storage cell 160 and an opposite type electricity storage cell 160 are made to overlap each other in a posture where the dorsal surfaces 165 are made to face each other, and the lead-out directions of the lead-out electrodes 163 and 164 face the same direction. The tip portion 164A of the lead-out electrode 164 of the opposite type electricity storage cell 160 and the tip portion 163A of the lead-out electrode 163 of the forward type electricity storage cell 160 overlap each other. The lead-out electrode 163 of the opposite type electricity storage cell 160 and the lead-out electrode 164 of the forward type electricity storage cell 160 are bent in mutually opposite directions.

The lead-out electrode 164 of the opposite type electricity storage cell 160 and the lead-out electrode 163 of the forward type electricity storage cell 160 are inserted into the opening 141 of the first fixing member 140A from the bottom surface 152 side. At this time, a state where the outer surface of the lead-out electrode 164 of the opposite type electricity storage cell 160 comes into contact with the second side surface 143 of the opening 141 is maintained. As the bending position of the lead-out electrode 164 gets into touch with the step 144, the depth of insertion is kept constant. The outer surface of the tip portion 164A of the lead-out electrode 164 is exposed to the top surface 153 side of the first fixing member 140A. The inner surface (the surface opposite the surface in contact with the tip portion 164A) of the tip portion 163A of the lead-out electrode 163 is exposed to the bottom surface 152 side of the first fixing member 140A. The lead-out electrodes 163 and 164 inserted into the opening 141 of the first fixing member 140A form the electrode pair of the L-shaped structure of Embodiment 1 shown in FIG. 2.

Figure 13B:
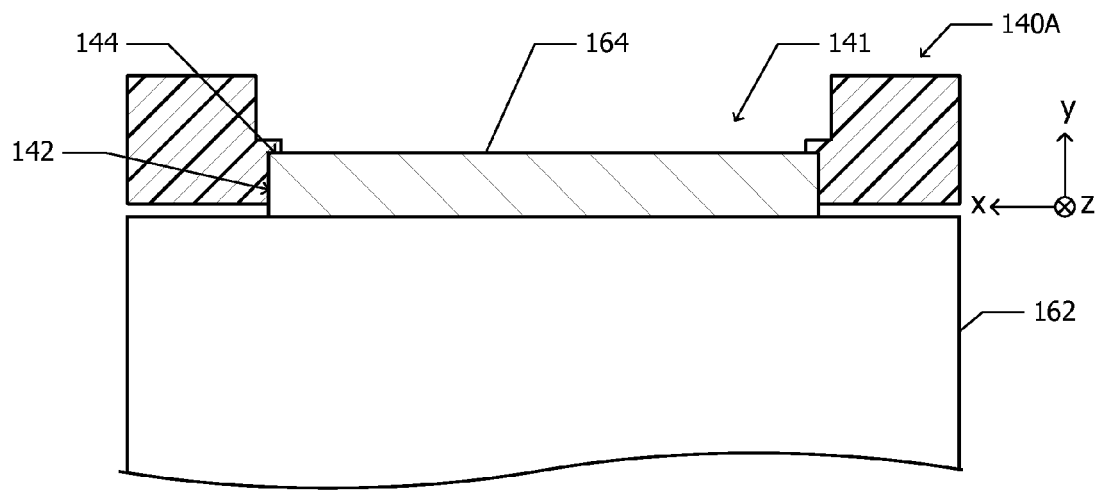
FIG. 13B is a cross-sectional view of the lead-out electrodes and the first fixing member during welding.

As shown in FIG. 13B, the edges on both sides of the lead-out electrode 164 inserted into the opening 141 come into contact with the first side surfaces 142 of the opening 141. Although not shown in the cross-section of FIG. 13B, the edges on both sides of the lead-out electrode 163 (FIG. 13A) inserted into the opening 141 also come into contact with the first side surfaces 142. The opening 141 is formed so that the dimension thereof in the x-direction becomes equal to the width of the lead-out electrodes 163 and 164. For this reason, in a state where the lead-out electrodes 163 and 164 are inserted into the opening 141, the relative positional relationship of both the electrodes is constrained in a direction orthogonal to a virtual plane (the yz plane) parallel to both the overlap direction (z-direction) of the electricity storage cells 160 and the lead-out direction (y-direction) of the lead-out electrodes, that is, the width direction (x-direction). Thereby, the positioning between the lead-out electrodes 163 and 164 can be easily performed.

Returning to FIG. 13A, description will be continued. The tip portions 163A and 164A that overlap each other are arranged between an anvil 170 of an ultrasonic welder, and an ultrasonic horn 171. For example, the anvil 170 is inserted into the opening 141 from the bottom surface 152 side of the first fixing member 140A. The ultrasonic horn 171 faces the surface of the tip portion 164A that faces the same direction as the top surface 153. The electricity storage container 162 is withdrawn to a side of the anvil 170 so that the electricity storage container 162 does not hinder insertion of the anvil 170. At this time, the vicinity of connecting portions between the electricity storage stack 161 (FIGS. 12A to 12C) within the electricity storage container 162 and the lead-out electrodes 163 and 164 is temporarily bent.

In this state, the tip portions 164A and 163A inserted into the opening 141 are ultrasonically welded. Instead, the tip portions 164A and 163A may be anchored to each other by methods other than the ultrasonic welding. Since the relative positional relationship of the lead-out electrodes 163 and 164 that should be anchored to each other is constrained, the positional deviation between both the electrodes during anchoring processing can be prevented.

FIG. 13C shows a cross-sectional view of the electricity storage cell 160 and the first fixing member 140A after the ultrasonic welding. A plurality of electricity storage cell pairs in which the dorsal surfaces 165 are made to face each other and the lead-out electrodes 163 and 164 are anchored to each other is produced.

Figure 14:
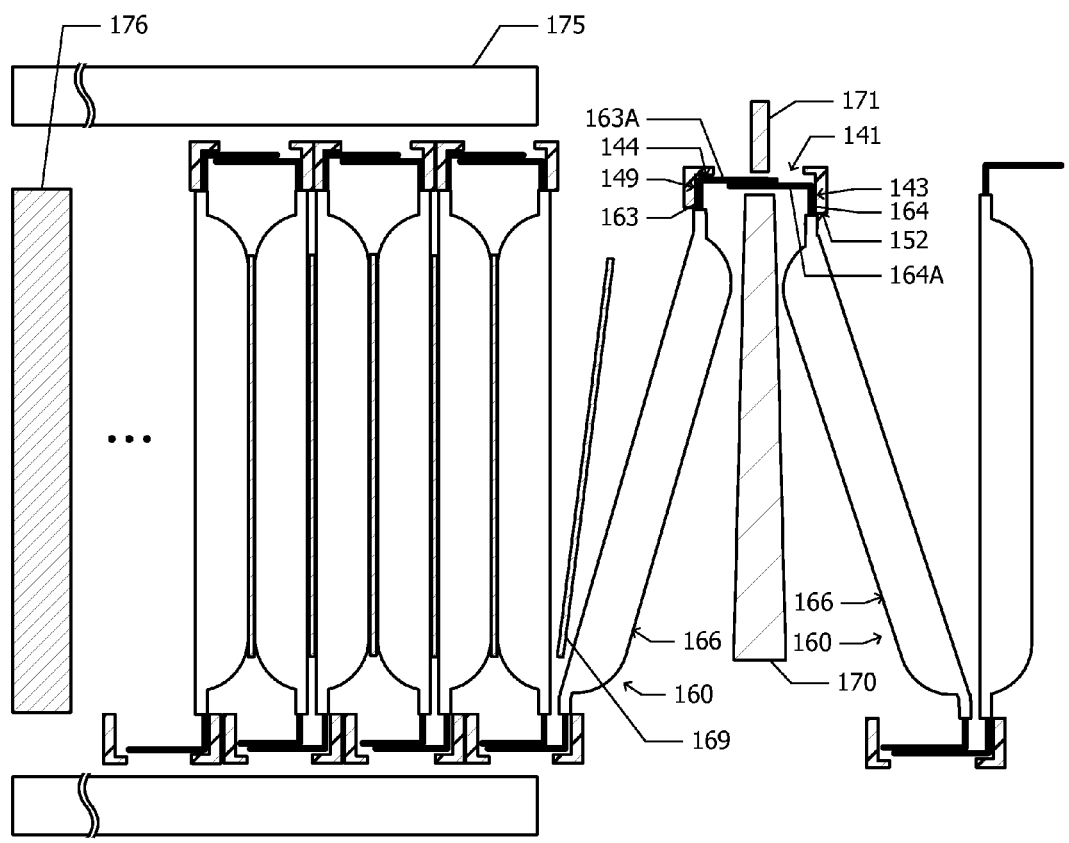
FIG. 14 is a schematic cross-sectional view of the electricity storage cell, the ultrasonic welder, and a temporary storage case when ultrasonic welding of the lead-out electrodes of the electricity storage cell is performed.

As shown in FIG. 14, the ventral surface 166 of an opposite type electricity storage cell 160 of one electricity storage cell pair and the ventral surface 166 of the forward type electricity storage cell 160 of another electricity storage cell pair are made to face each other. At this time, the posture of the electricity storage cell pairs is maintained so that the lead-out directions of the lead-out electrodes 163 and 164 face the same direction. In this state, the lead-out electrode 163 of the opposite type electricity storage cell 160 and the lead-out electrode 164 of the forward type electricity storage cell 160 are inserted into the opening 141 of the second fixing member 140B from the bottom surface 152 side. At this time, a state where the outer surface of one lead-out electrode 163 comes into contact with the third side surface 149 of the opening 141 and the outer surface of the other lead-out electrode 164 comes into contact with the second side surface 143 of the opening 141 is maintained. As the bending positions of the lead-out electrodes 163 and 164 get into touch with the step 144, the insertion depths of the lead-out electrodes 163 and 164 can be kept constant. The tip portion 163A of the lead-out electrode 163 and the tip portion 164A of the lead-out electrode 164 overlap each other within the opening 141. The lead-out electrodes 163 and 164 inserted into the opening 141 of the second fixing member 140B form the electrode pair of the bridge structure of Embodiment 1 shown in FIG. 2.

The tip portions 163A and 164A that overlap each other are arranged between the anvil 170 and the ultrasonic horn 171 and are subjected to ultrasonic welding. Instead, the tip portions 163A and 164A may be anchored to each other by methods other than the ultrasonic welding.

The edges on both sides of the lead-out electrodes 163 and 164 inserted into the opening 141 come into contact with the first side surfaces 142 (FIG. 10) of the opening 141. For this reason, the relative positional relationship between the lead-out electrodes 163 and 164 can be constrained in the width direction.

A plurality of electricity storage cells 160 are connected in series by performing ultrasonic welding processing on a plurality of the electricity storage cell pairs. A heat transfer plate 169 is inserted between the electricity storage cells 160 that are connected in series and adjacent to each other, and the electricity storage cell 160 and the heat transfer plate 169 are accommodated sequentially within a temporary storage case 175 from an opening portion thereof. An end plate 176 is stored in the bottom surface of the temporary storage case 175. The electricity storage cells 160 and the heat transfer plates 169 are alternately stacked on one surface (a side in FIG. 14) of the end plate 176.

Figure 15:
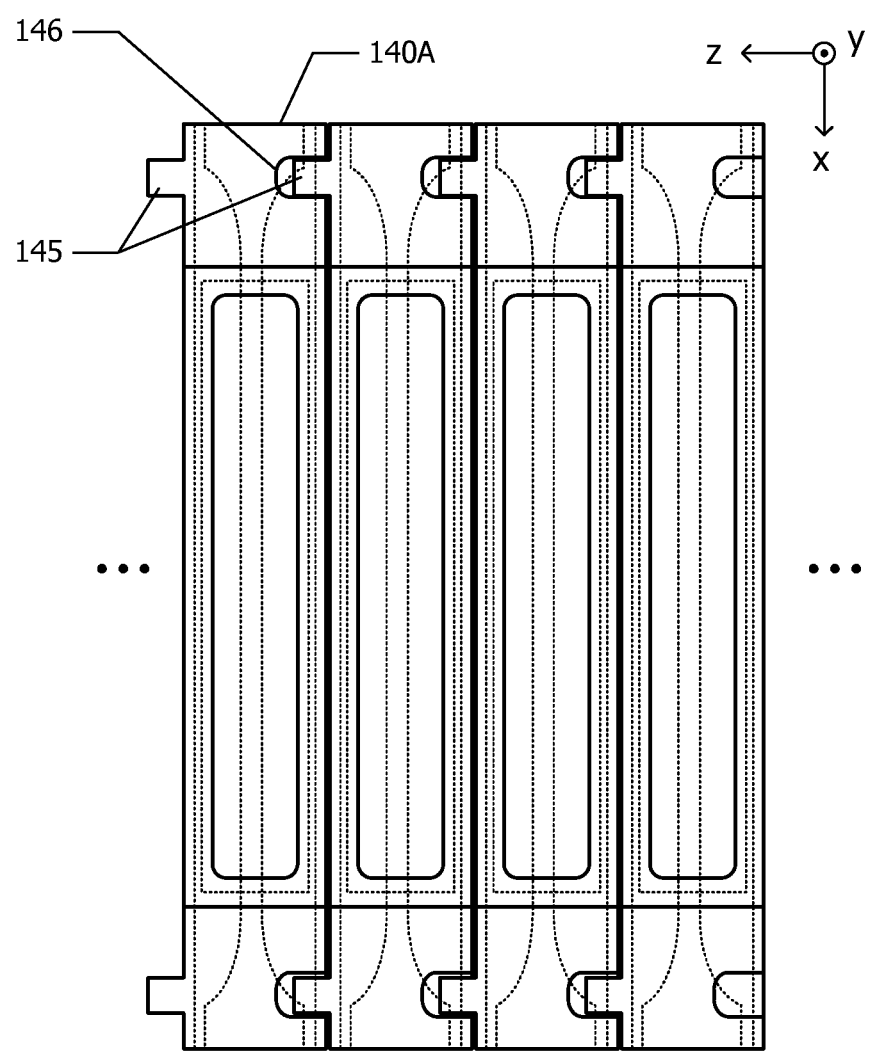
FIG. 15 is a plan view of a stacked first fixing member.

FIG. 15 shows a plan view of the first fixing member 140A in the state of being accommodated within the temporary storage case 175 (FIG. 14). A plurality of the first fixing members 140A are arranged in the stack direction (z-direction). The protrusions 145 of one first fixing member 140A of the first fixing members 140A adjacent to each other, and the recesses 146 of the other first fixing member 140A fit to each other. Similarly, even in the second fixing member 140B, the protrusions 145 and the recesses 146 (FIG. 10) fit to each other. Thereby, the relative positional relationship of the first fixing member 140A and the second fixing member 140B in the x-direction is constrained.

The positions of the lead-out electrodes 163 and 164 of the electricity storage cell 160 in the width direction (x-direction), as already described, are constrained with respect to the first fixing member 140A and the second fixing member 140B. Additionally, the lead-out electrodes 163 and 164 are attached to the electricity storage stack 161 (FIGS. 12A to 12C) within the electricity storage container 162. For this reason, the relative positional relationship of the electricity storage stacks 161 within the stacked electricity storage cells 160 in the x-direction can be constrained.

In this way, the lead-out electrodes 163 and 164 are covered with the first fixing member 140A or second fixing member 140B that is formed from an insulating material, and are constrained to the fixing members 140A and 140B. For this reason, even if a vibration or impact is applied to the electricity storage module, the short-circuit fault between the lead-out electrodes can be prevented. Additionally, since the lead-out electrodes 163 and 164 are accommodated within the first fixing member 140A or the second fixing member 140B, even if a vibration or impact is applied to the electricity storage module, occurrence of the poor contact between the lead-out electrodes that are welded to each other can be prevented.

Figure 16:
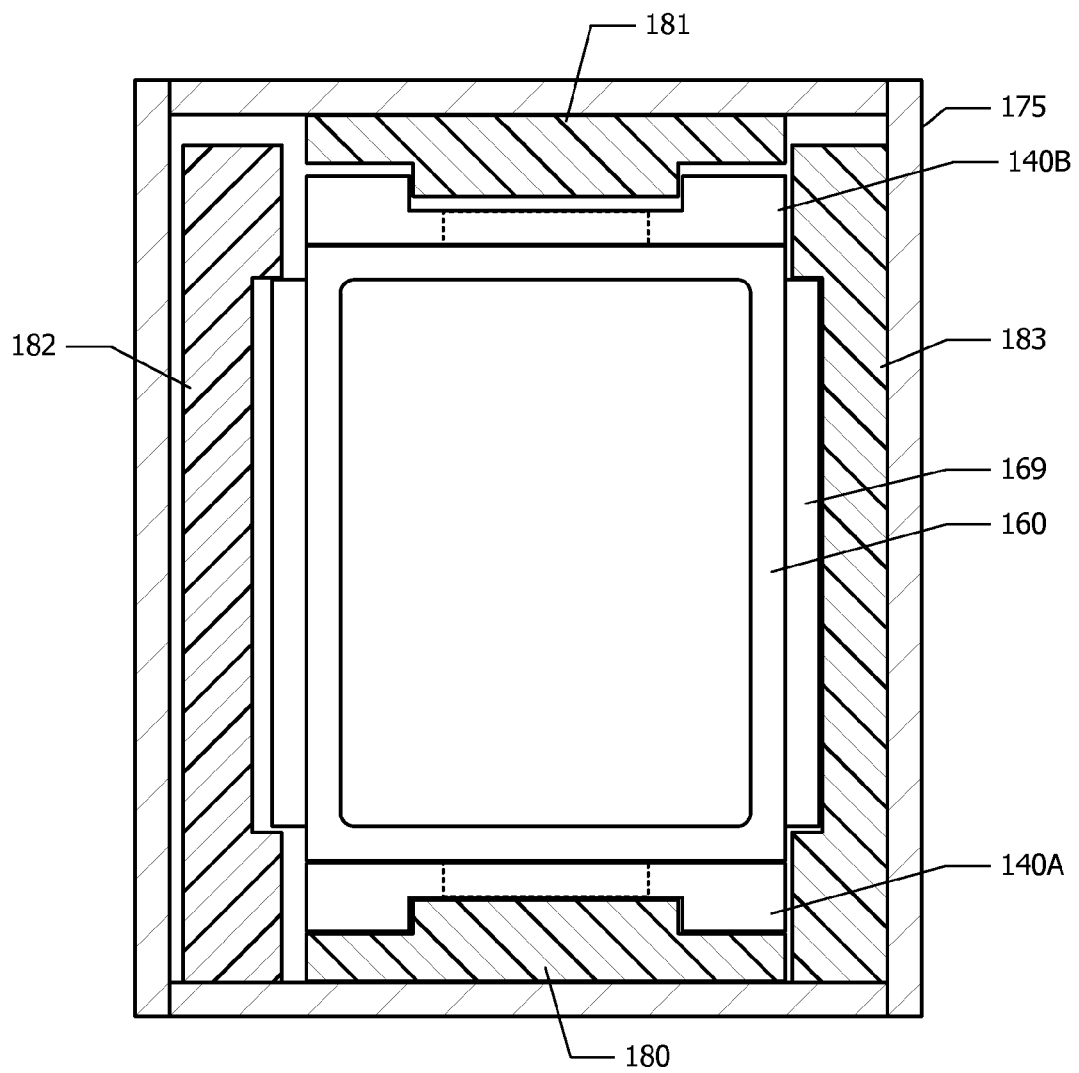
FIG. 16 is a cross-sectional view of the electricity storage cell, a heat transfer plate, and the temporary storage case in the state of being stored in the temporary storage case (Step 1).

FIG. 16 shows a cross-sectional view of the temporary storage case 175 that accommodates the electricity storage cells 160. The temporary storage case 175 includes a lower guide 180, an upper guide 181, and side guides 182 and 183 that are arranged corresponding to respective sides of the rectangular electricity storage cells 160. The direction that faces the upper guide 181 from the lower guide 180 is defined as a height direction, and the direction orthogonal to the stack direction and height direction of the electricity storage cells 160 is defined as a width direction (lateral direction in FIG. 16).

The first fixing member 140A is guided in the stack direction (direction perpendicular to the sheet plane of FIG. 16) by the lower guide 180. Similarly, the second fixing member 140B is guided in the stack direction by the upper guide 181. As the ends of the heat transfer plates 169 are accommodated in the grooves of the side guides 182 and 183 that extend in the stack direction, the position of the heat transfer plates 169 in the height direction is adjusted.

Figure 17:
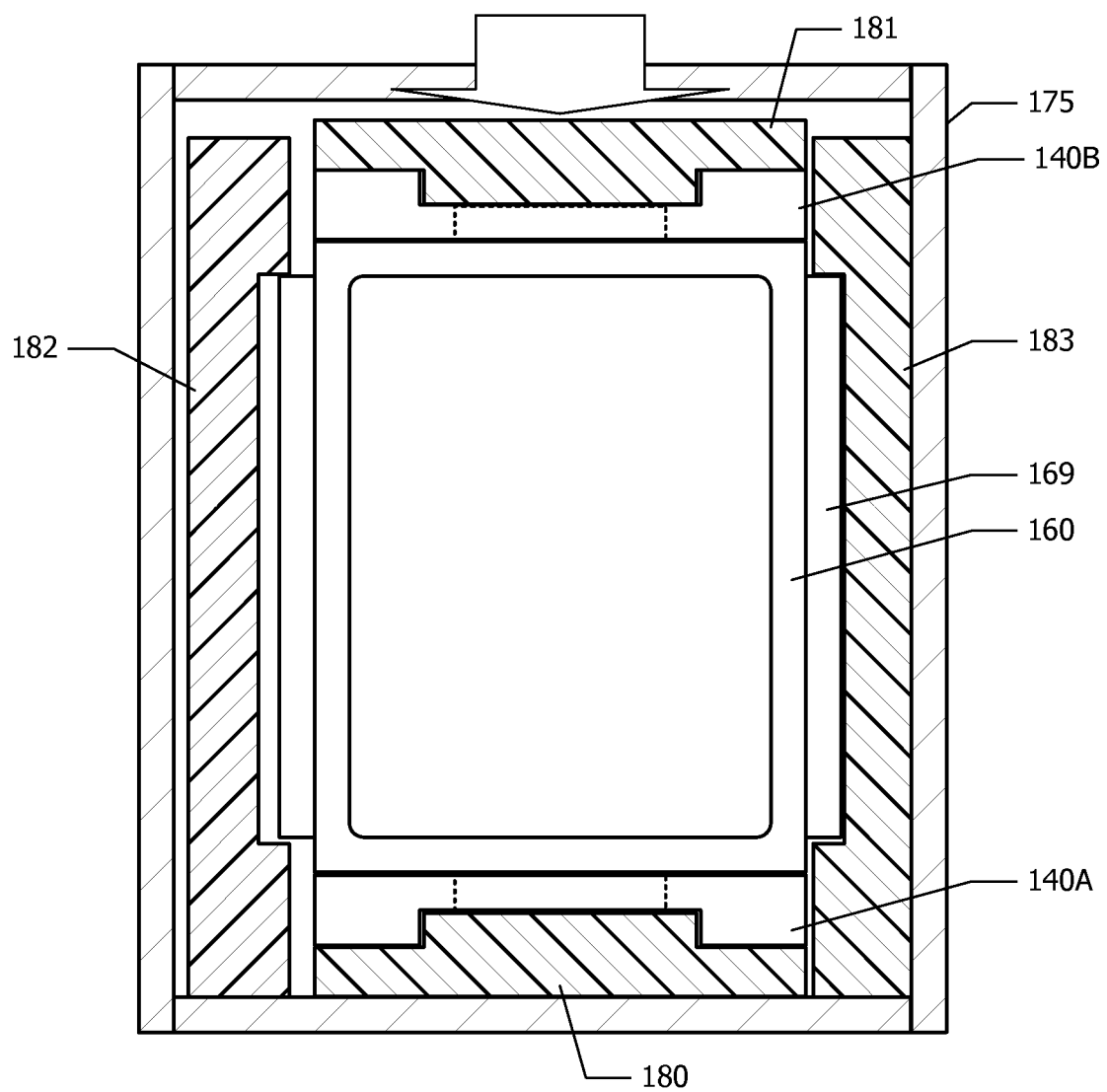
FIG. 17 is a cross-sectional view of the electricity storage cell, the heat transfer plate, and the temporary storage case in the state of being stored in the temporary storage case (Step 2).

As shown in FIG. 17, the load that faces the lower guide 180 is applied to the upper guide 181. Thereby, the positions of the electricity storage cells 160 in the height direction are aligned.

Figure 18:
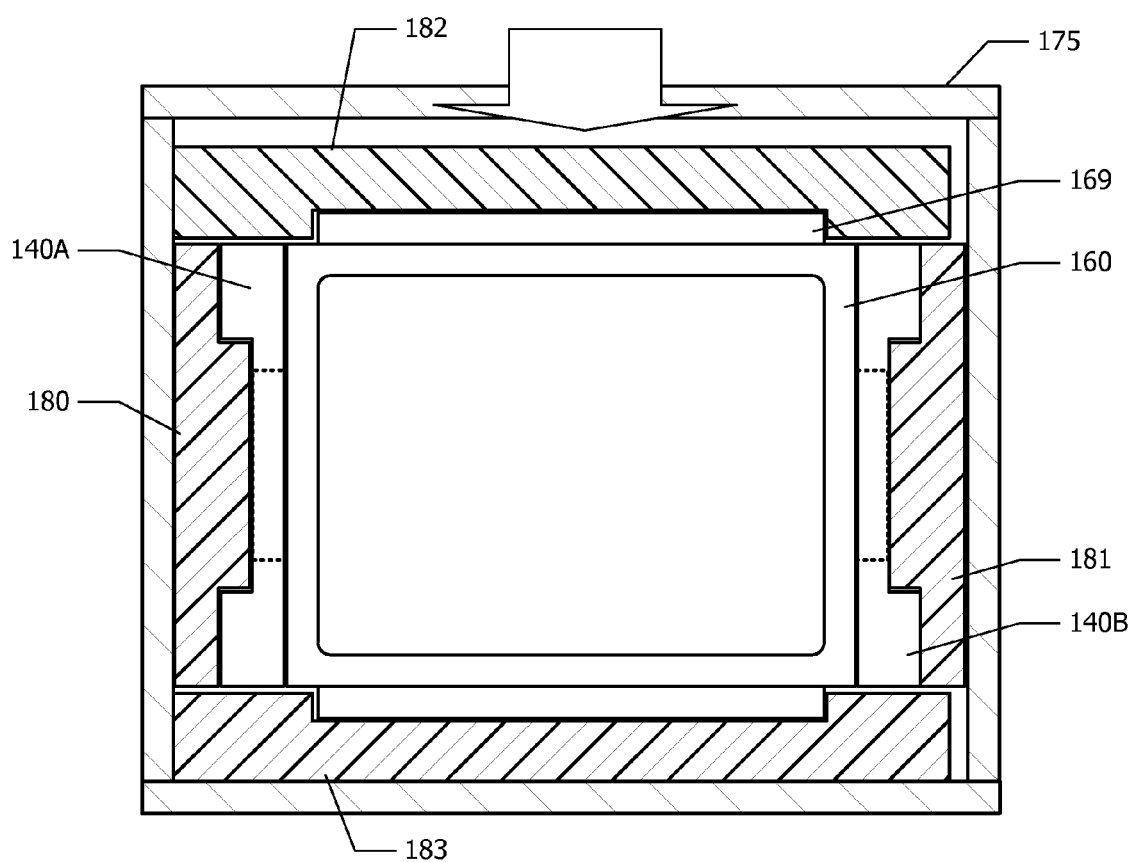
FIG. 18 is a cross-sectional view of the electricity storage cell, the heat transfer plate, and the temporary storage case in the state of being stored in the temporary storage case (Step 3).

As shown in FIG. 18, the temporary storage case 175 is rotated by 90° with an axis parallel to the stack direction of the electricity storage cell 160 as a rotation center. The load, in the direction in which the side guides 182 and 183 approach each other, is applied to both the guides. Thereby, the positions of the heat transfer plates 169 in the width direction (longitudinal direction in FIG. 18) can be aligned.

Figure 19:
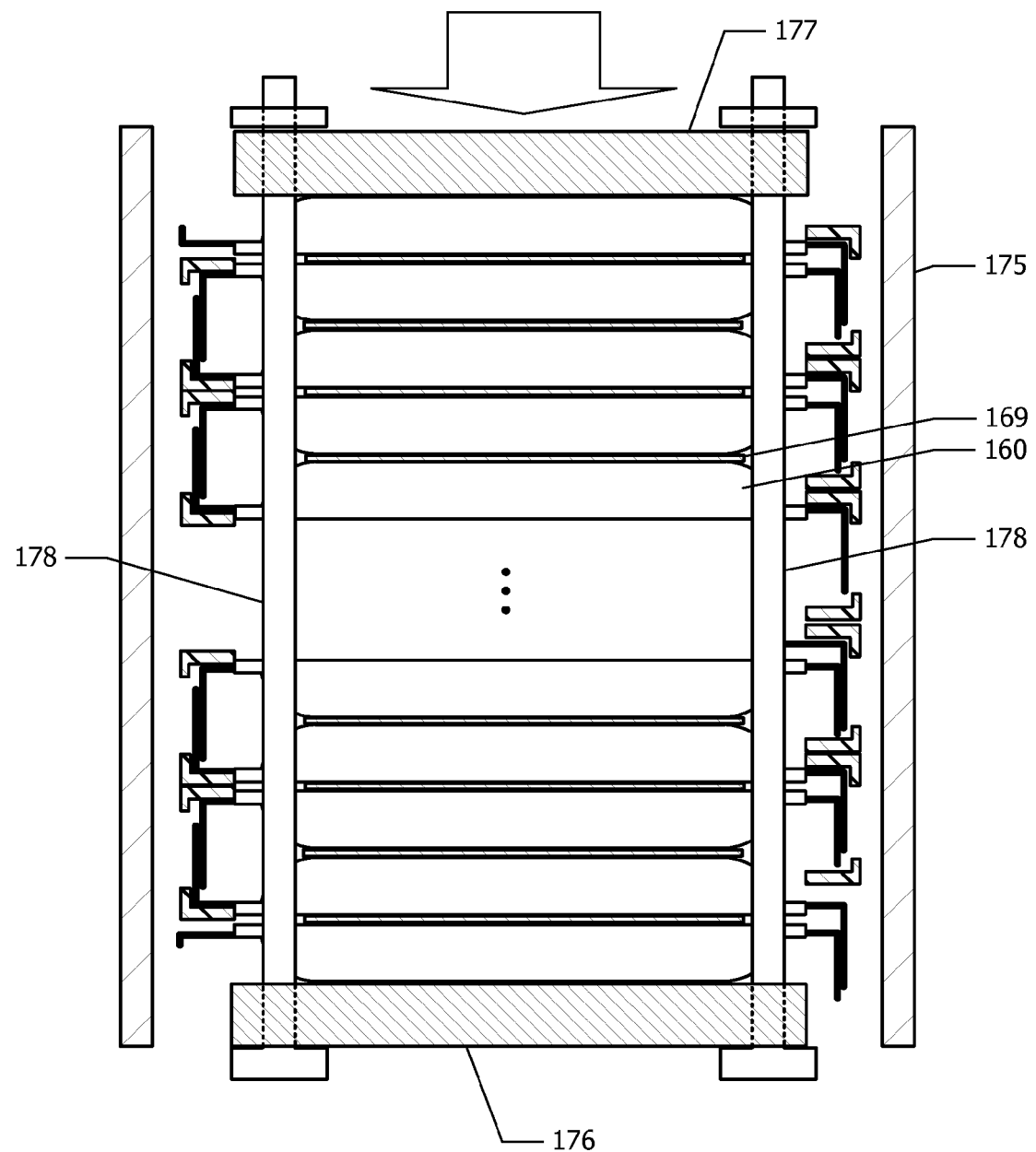
FIG. 19 is a cross-sectional view of the electricity storage cell, the heat transfer plate, and the temporary storage case in the state of being stored in the temporary storage case (Step 4).

As shown in FIG. 19, an end plate 177 is arranged on the outer surface of the outermost electricity storage cell 160. The load in the direction that faces the other end plate 176 is applied to the end plate 177. Thereby, a compressive force in the stack direction is applied to the electricity storage cells 160 and the heat transfer plates 169. In the state where the compressive force is applied, a plurality of tie-rods 178 penetrate from one end plate 176 to the other end plate 177, and bolts are fastened to the tie-rods 178. Thereby, even if the load applied to the end plate 177 is removed, the compressive force applied to the electricity storage cells 160 and the heat transfer plates 169 is maintained. The electricity storage cells 160 and the heat transfer plates 169 are mechanically supported between the end plates 176 and 177 by this compressive force.

In the process so far, the electricity storage module in which a plurality of electricity storage cells 160 are connected in series is obtained. Thereafter, the electricity storage module is taken out from the temporary storage case 175. Further, a predetermined compressive force is applied to the end plates 176 and 177, and the bolts of the tie-rods 178 are fastened.

The temporary storage case 175 may be used as a cladding case for an electricity storage module for being mounted on an operating machine. As described with reference to FIG. 15, since the variation of the positions of the electricity storage cells 160 in the x-direction can be reduced, the electricity storage cells 160 and the inner wall of the temporary storage case 175 can be sufficiently separated from each other.

Figure 20A:
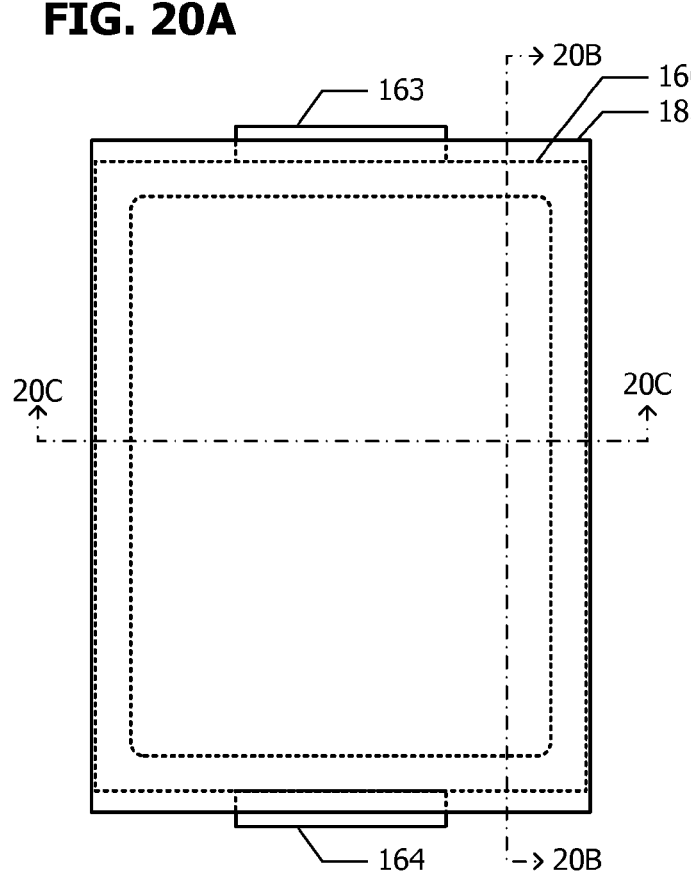
FIG. 20A is a plan view of the electricity storage cell and a cladding film.
Figure 20B:
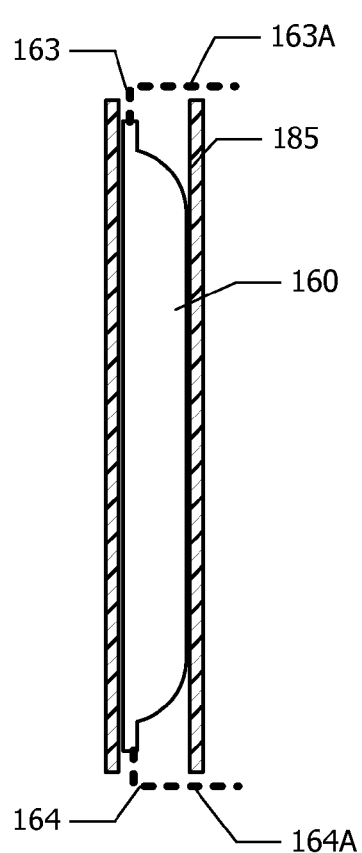
FIGS. 20B and 20C are cross-sectional views taken along one-dot chain lines 20B-20B and 20C-20C of FIG. 20A, respectively.
Figure 20C:
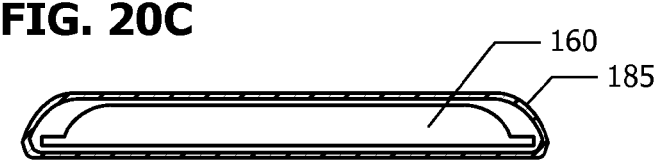

As shown in FIG. 20A, each of the electricity storage cells 160 may be covered with a cladding film 185. Cross-sectional views taken along a one-dot chain line 20B-20B and a one-dot chain line 20C-20C of FIG. 20A are shown in FIGS. 20B and 20C, respectively. The cladding film 185 has a tubular shape and the portions thereof corresponding to the edges from which the lead-out electrodes 163 and 164 are led out are opened. The edges of the cladding film 185 that are opened cover the bases of the lead-out electrodes 163 and 164. The tip portions 163A and 164A are led out to the outside of a space surrounded by the cladding film 185.

FIG. 21A shows a cross-sectional view of two electricity storage cells 160 of which the dorsal surfaces 165 are made to face each other, and the first fixing member 140A. As shown in FIGS. 13A to 13C, the lead-out electrodes 163 and 164 are inserted into the opening 141 of the first fixing member 140A. At this time, as shown in FIG. 21A, the edges of the open ends of the cladding films 185 are inserted into the groove 148.

FIG. 21B shows a cross-sectional view of two electricity storage cells 160 of which the ventral surfaces 166 are made to face each other, and the second fixing member 140B. As shown in FIG. 14, the lead-out electrodes 163 and 164 are inserted into the opening 141 of the second fixing member 140B. At this time, as shown in FIG. 21B, the edge of the open end of the cladding film 185 that surrounds one electricity storage cell 160 is inserted into one groove 148A, and the edge of the open end of the cladding film 185 that surrounds the other electricity storage cell 160 is inserted into the other groove 148B.

In this way, the groove 148 of the first fixing member 140A and the grooves 148A and 148B of the second fixing member 140B have a role to accommodate the edges of the open ends of the cladding films 185.

In Embodiments 1 to 7, although the electric double layer capacitors are used as the electricity storage cells 20, other devices that can store electricity may be used. For example, it is possible to use secondary cells, such as a lithium ion cells, lithium ion capacitors, or the like, as the electricity storage cells 20.

[Embodiment 8]

With reference to FIGS. 22 to 27, an operating machine according to Embodiment 8 on which the electricity storage modules according to Embodiments 1 to 7 are mounted will be described taking a shovel as an example. Although a hybrid shovel is illustrated in FIGS. 22 to 26, the electricity storage modules according to Embodiments 1 to 7 can also be mounted on electric operating machines, such as other hybrid operating machines or electric operating machines such as electric shovels.

Figure 22:
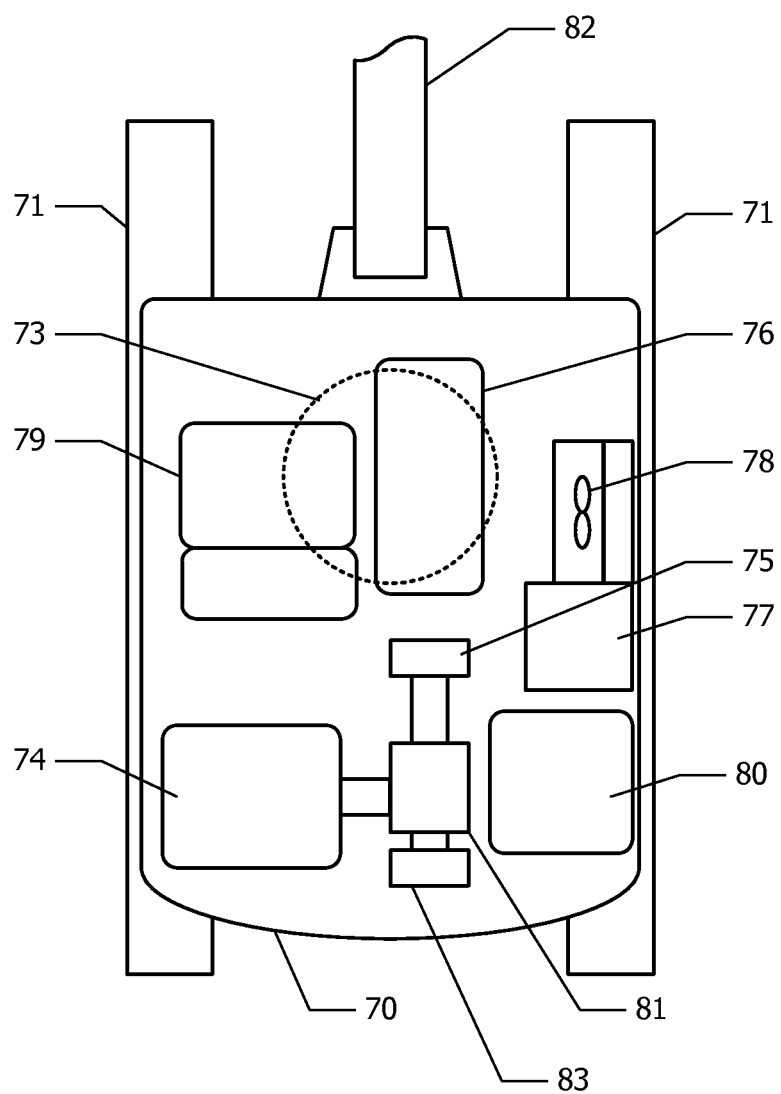
FIG. 22 is a schematic plan view of a hybrid shovel according to Embodiment 8 on which an electricity storage module is mounted.

FIG. 22 is a schematic plan view of a hybrid shovel. A lower traveling body (traveling device) 71 is attached to an upper rotating body 70 via a rotating bearing 73. An engine 74, a main pump 75, an electric motor 76 for rotation, an oil tank 77, a cooling fan 78, a seat 79, an electricity storage module 80, and a motor generator 83 are mounted on the upper rotating body 70. The engine 74 generates power (motive power) through combustion of fuel. The engine 74, the main pump 75, and the motor generator 83 mutually transmit and receive torque via a torque transfer mechanism 81. The main pump 75 supplies pressure oil to a hydraulic cylinder of a boom 82 or the like.

The motor generator 83 is driven by the power of the engine 74 to generate electricity (power-generating operation). The generated electric power is supplied to the electricity storage module 80 so as to charge the electricity storage module 80. The motor generator 83 is driven by the electric power from the electricity storage module 80 to generate the power for assisting the engine 74 (assist operation). The oil tank 77 stores oil for a hydraulic circuit. The cooling fan 78 suppresses a rise in the oil temperature of the hydraulic circuit. An operator sits on the seat 79 to handle the hybrid shovel.

Figure 23:
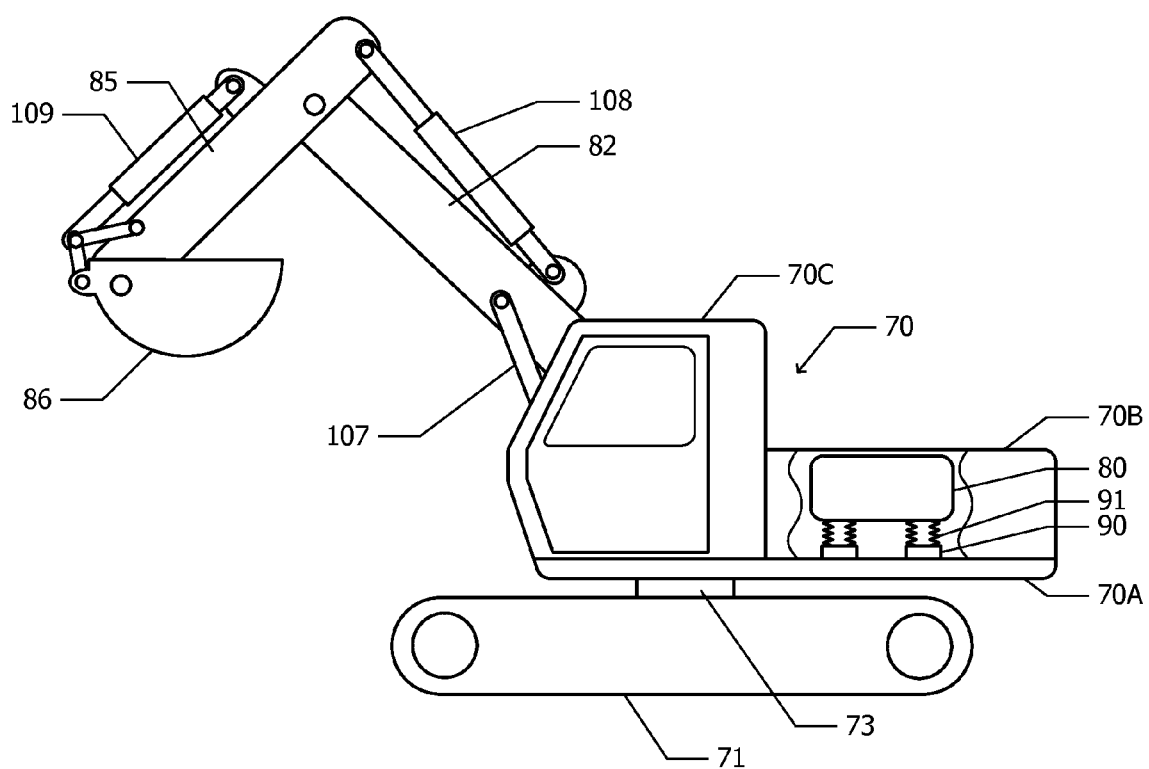
FIG. 23 is a schematic side view of the hybrid shovel according to Embodiment 8.

FIG. 23 shows a partially broken side view of the hybrid shovel. The upper rotating body 70 is mounted on the lower traveling body 71 via the rotating bearing 73. The upper rotating body 70 includes a rotating frame 70A, a cover 70B, and a cabin 70C. The rotating frame 70A functions as a supporting structure for the cabin 70C and various parts. The cover 70B covers various parts mounted on the rotating frame 70A, for example, the electricity storage module 80 or the like. The seat 79 (FIG. 22) is accommodated within the cabin 70C.

The electric motor 76 (FIG. 22) for rotation rotates the rotating frame 70A, which is a target to be driven, clockwise or counterclockwise with respect to the lower traveling body 71. The boom 82 is attached to the upper rotating body 70. The boom 82 swings in the vertical direction, with respect to the upper rotating body 70, by a boom cylinder 107 that is hydraulically driven. An arm 85 is attached to the tip of the boom 82. The arm 85 swings, in the front-and-rear direction with respect to the boom 82, by an arm cylinder 108 that is hydraulically driven. A bucket 86 is attached to the tip of the arm 85. The bucket 86 swings, in the vertical direction with respect to the arm 85, by a bucket cylinder 109 that is hydraulically driven.

The electricity storage module 80 is mounted on the rotating frame 70A via a mount 90 for an electricity storage module and a damper (anti-vibration device) 91. The electricity storage module 80 is arranged, for example, behind the cabin 70C. The cover 70B covers the electricity storage module 80. The electricity storage modules according to the above Embodiments 1 to 7 are used as the electricity storage module 80. The electric motor 76 (FIG. 22) for rotation is driven by the electric power supplied from the electricity storage module 80. Additionally, the electric motor 76 for rotation converts kinetic energy into electrical energy to generate regenerative electric power. The electricity storage module 80 is charged by the generated regenerative electric power.

Figure 24:
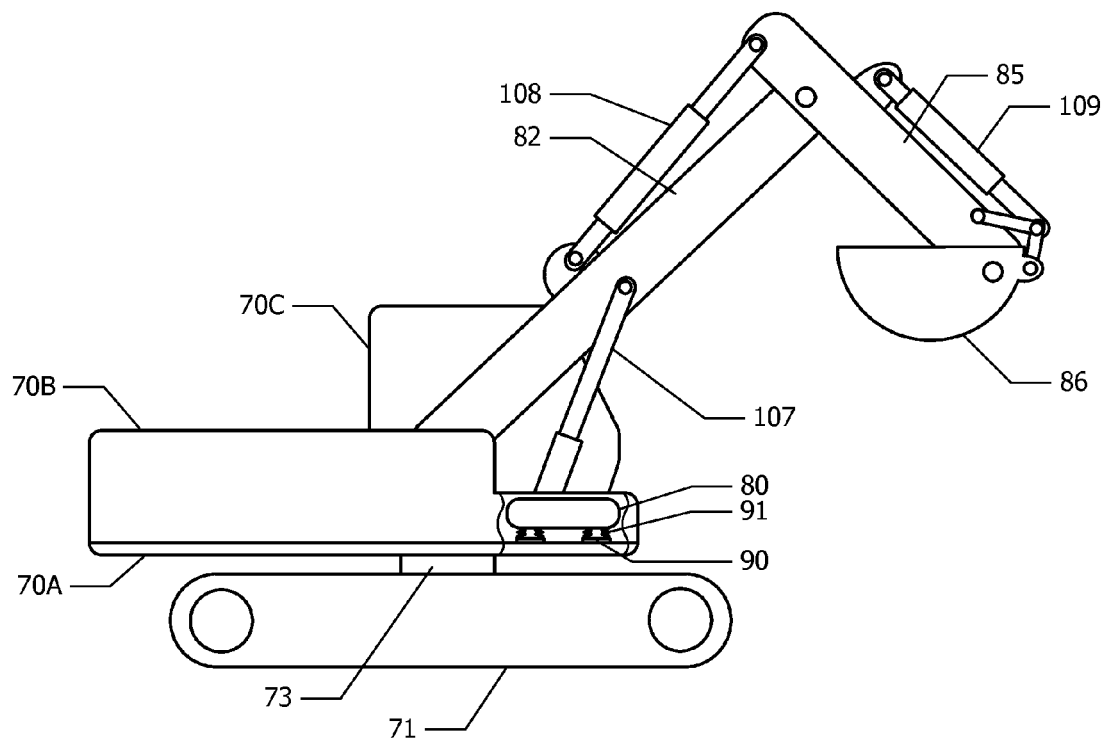
FIG. 24 is a schematic side view of a hybrid shovel according to Modification 1 of Embodiment 8.

FIG. 24 shoes a partially broken side view of a shovel according to Modification 1 of Embodiment 8. In the following, attention will be paid to differences from the shovel according to Embodiment 8 shown in FIG. 23, and description of the same configuration will be omitted.

Although the electricity storage module 80 is arranged behind the cabin 70C in the example shown in FIG. 23, the electricity storage module 80 is arranged at a side of the cabin 70C in the modification shown in FIG. 24. The boom 82 is arranged between the cabin 70C and the electricity storage module 80. Even in this modification, the electricity storage module 80 is mounted on the rotating frame 70A and is covered with the cover 70B.

Figure 25:
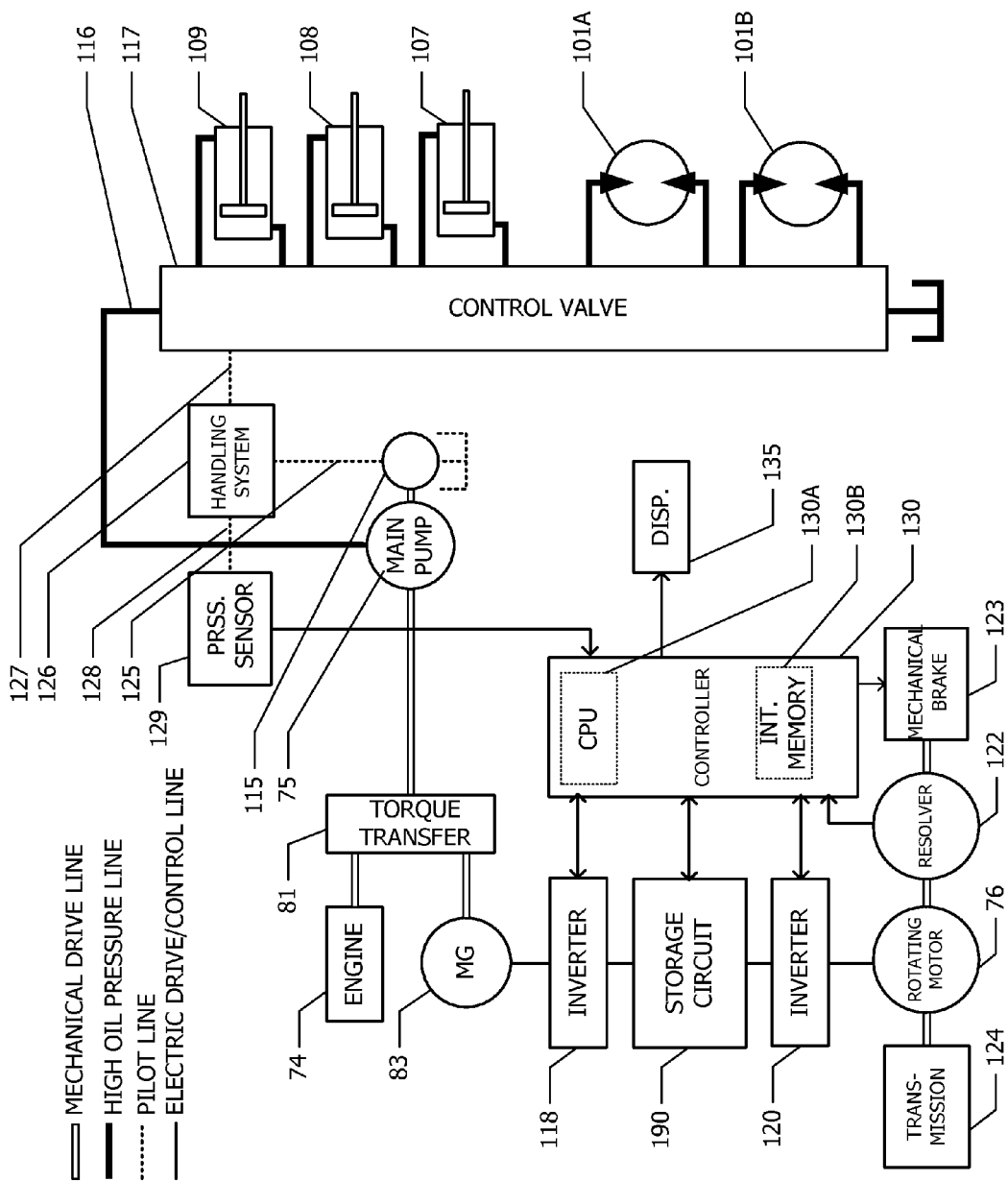
FIG. 25 is a block diagram of the hybrid shovel according to Embodiment 8.

FIG. 25 shows a block diagram of the hybrid shovel according to Embodiment 8. In FIG. 25, a mechanical power transmission line is expressed by a double line, a high oil pressure transmission line is expressed by a thick solid line, an electric transmission line is expressed by a thin solid line, and a pilot line is expressed by a broken line.

A drive shaft of the engine 74 is coupled to an input shaft of the torque transfer mechanism 81. Engines that generate a driving force with fuels other than electricity, for example, internal combustion engines, such as a diesel engine, are used as the engine 74. The engine 74 is always driven during the operation of the operating machine.

A drive shaft of the motor generator 83 is coupled to another input shaft of the torque transfer mechanism 81. The motor generator 83 can perform both the electric (assist) operation and the power-generating operation. For example, an interior permanent magnet (IPM) motor in which magnets are embedded inside a rotor is used for the motor generator 83.

The torque transfer mechanism 81 has two input shafts and one output shaft. A drive shaft of the main pump 75 is coupled to this output shaft.

In a case where the load applied to the engine 74 is large, the motor generator 83 performs an assist operation and the driving force of the motor generator 83 is transmitted to the main pump 75 via the torque transfer mechanism 81. This reduces the load applied to the engine 74. On the other hand, when the load applied to the engine 74 is small, the motor generator 83 is operated to generate power as the driving force of the engine 74 is transmitted to the motor generator 83 via the torque transfer mechanism 81. Switching of the motor generator 83 between the assist operation and the power-generation operation is performed by an inverter 118 connected to the motor generator 83. The inverter 118 is controlled by a controller 130.

The controller 130 includes a central processing unit (CPU) 130A and an internal memory 130B. The CPU 130A executes a driving control program stored in the internal memory 130B. The controller 130 makes degradation states or the like of various devices be displayed on a display device 135, thereby calling a driver's attention to them.

The main pump 75 supplies oil pressure to a control valve 117 via the high oil pressure line 116. The control valve 117 distributes oil pressure to hydraulic motors 101A and 1016, the boom cylinder 107, the arm cylinder 108, and the bucket cylinder 109 according to commands from the driver. The hydraulic motors 101A and 1016 drive two left and right crawlers, which are provided in the lower traveling body 71 shown in FIGS. 22 and 23, respectively.

Input and output terminals of the electric system of the motor generator 83 are connected to an electricity storage circuit 190 via the inverter 118. The inverter 118 performs operation control of the motor generator 83 on the basis of a command from the controller 130. An electric motor 76 for rotation is further connected to the electricity storage circuit 190 via another inverter 120. The electricity storage circuit 190 and the inverter 120 are controlled by the controller 130.

Required electric power is supplied to the motor generator 83 from the electricity storage circuit 190 while the assist operation of the motor generator 83 is performed. The electric power that is generated by the motor generator 83 is supplied to the electricity storage circuit 190 while the power-generating operation of the motor generator 83 is performed.

The electric motor 76 for rotation is driven with an alternating current by a pulse-width-modulation (PWM) control signal from the inverter 120 to perform both a power operation and a regenerative operation. An IPM motor, for example, is used for the electric motor 76 for rotation. The IPM motor generates a large induced electromotive force during regeneration.

The electric motor 76 for rotation rotates the upper rotating body 70 via a speed reducer 124 during the power operation of the electric motor 76 for rotation. In this case, the speed reducer 124 slows the rotating speed. This increases a rotative force generated by the electric motor 76 for rotation. During the regenerative operation, the rotation motion of the upper rotating body 70 is transmitted to the electric motor 76 for rotation via the speed reducer 124, whereby the electric motor 76 for rotation generates regenerative electric power. In this case, the speed reducer 124 increases rotating speed contrary to during the power operation. Thereby, the number of rotations of the electric motor 76 for rotation can be raised.

A resolver 122 detects a position in the rotational direction of the rotating shaft of the electric motor 76 for rotation. The detection result is input to the controller 130. By detecting positions in the rotational direction of the rotating shaft of the electric motor 76 for rotation before operation and after operation, a rotation angle and a rotation direction are derived.

A mechanical brake 123 is coupled to the rotating shaft of the electric motor 76 for rotation so as to generate a mechanical braking force. The braking state and release state of the mechanical brake 123 are switched by an electromagnetic switch under control from the controller 130.

The pilot pump 115 generates pilot pressure required for a hydraulic handling line. The generated pilot pressure is supplied to a handling system 126 via a pilot line 125. The handling system 126 includes a lever or a pedal, and is handled by a driver. The handling system 126 converts primary oil pressure supplied from the pilot line 125 into secondary oil pressure according to the handling of the driver. The secondary oil pressure is transmitted to the control valve 117 via an oil pressure line 127, and is transmitted to a pressure sensor 129 via another oil pressure line 128.

The pressure detection result detected by the pressure sensor 129 is input to the controller 130. Thereby, the controller 130 can detect the handling situations of the lower traveling body 71, the electric motor 76 for rotation, the boom 82, the arm 85, and the bucket 86.

Figure 26:
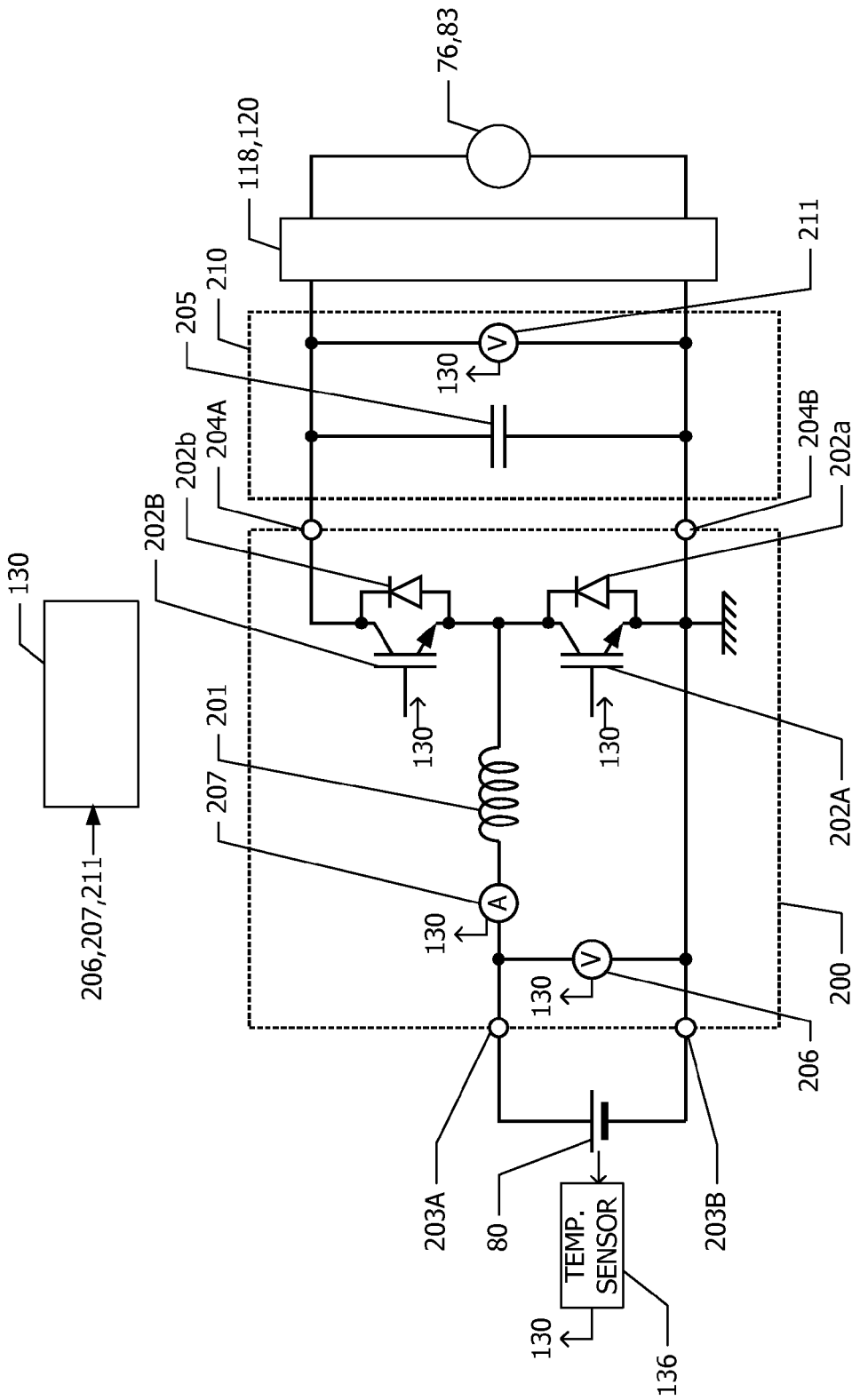
FIG. 26 is an equivalent circuit diagram of an electricity storage circuit of the hybrid shovel according to Embodiment 8.

FIG. 26 shows an equivalent circuit diagram of the electricity storage circuit 190. An electricity storage circuit 190 includes the electricity storage module 80, a converter 200, and a DC bus line 210. The electricity storage module 80 is connected to a pair of power source connecting terminals 203A and 203B of the converter 200, and the DC bus line 210 is connected to a pair of output terminals 204A and 204B. One power source connecting terminal 203B and one output terminal 204B are grounded. Some of the electricity storage modules according to the above Embodiments 1 to 7 are used as the electricity storage module 80.

The DC bus line 210 is connected to the motor generator 83 and the electric motor 76 for rotation via the inverters 118 and 120. A voltage generated in the DC bus line 210 is measured by a voltmeter 211, and the measurement result is input to the controller 130.

A series circuit, where a collector of a step-up insulated gate bipolar transistor (IGBT) 202A and an emitter of a step-down IGBT 202B are connected mutually, is connected between the output terminals 204A and 204B. An emitter of the step-up IGBT 202A is grounded, and a collector of the step-down IGBT 202B is connected to the output terminal 204A on the high-voltage side. A mutual connection point between the step-up IGBT 202A and the step-down IGBT 202B is connected to the power source connecting terminal 203A on the high-voltage side via a reactor 201.

Diodes 202a and 202b are connected to the step-up IGBT 202A and the step-down IGBT 202B in parallel, respectively, in such a manner that a forward direction corresponds to a direction from an emitter to a collector. A smoothing capacitor 205 is inserted between the output terminals 204A and 204B.

The voltmeter 206 connected between the power source connecting terminals 203A and 203B measures the voltage between terminals of the electricity storage module 80. An ammeter 207 inserted in series into the reactor 201 measures the charge/discharge current of the electricity storage module 80. The voltage and current measurement results are input to the controller 130.

A temperature detector 136 detects the temperature of the electricity storage module 80. The detected temperature data is input to the controller 130. The temperature detector 136 includes, for example, four thermometers prepared corresponding to four electricity storage cells selected from the plurality of electricity storage cells that constitute the electricity storage module 80. The controller 130, for example, calculates the average of the four pieces of temperature data acquired by the four thermometers, and adopts the average value as the temperature of the electricity storage module 80. When the overheating state of the capacitor is determined, the highest temperature among temperatures indicated by the four pieces of temperature data may be adopted as the temperature of the electricity storage module. On the contrary, the lowest temperature among the temperatures indicated by the four pieces of temperature data may be adopted as the temperature of the electricity storage module, in the determination of a state where the temperature of the electricity storage module falls excessively.

The controller 130 applies pulse-width-modulation (PWM) voltages for control to gate electrodes of the step-up IGBT 202A and the step-down IGBT 202B.

The step-up operation (discharge operation) will be described below. A PWM voltage is applied to the gate electrode of the step-up IGBT 202A. When the step-up IGBT 202A is turned off, an induced electromotive force is generated in the reactor 201 in a direction in which a current is made to flow from the power source connecting terminal 203A on the high-voltage side toward the collector of the step-up IGBT 202A. This electromotive force is applied to the DC bus line 210 via the diode 202b. Thereby, the DC bus line 210 is stepped up.

Next, the step-down operation (charge operation) will be described. A PWM voltage is applied to the gate electrode of the step-down IGBT 202B. When the step-down IGBT 202B is turned off, an induced electromotive force is generated in the reactor 201 in a direction in which a current is made to flow from the emitter of the step-down IGBT 202B toward the power source connecting terminal 203A on the high-voltage side. The electricity storage module 80 is charged through the diode 202a by this induced electromotive force.

Figure 27:
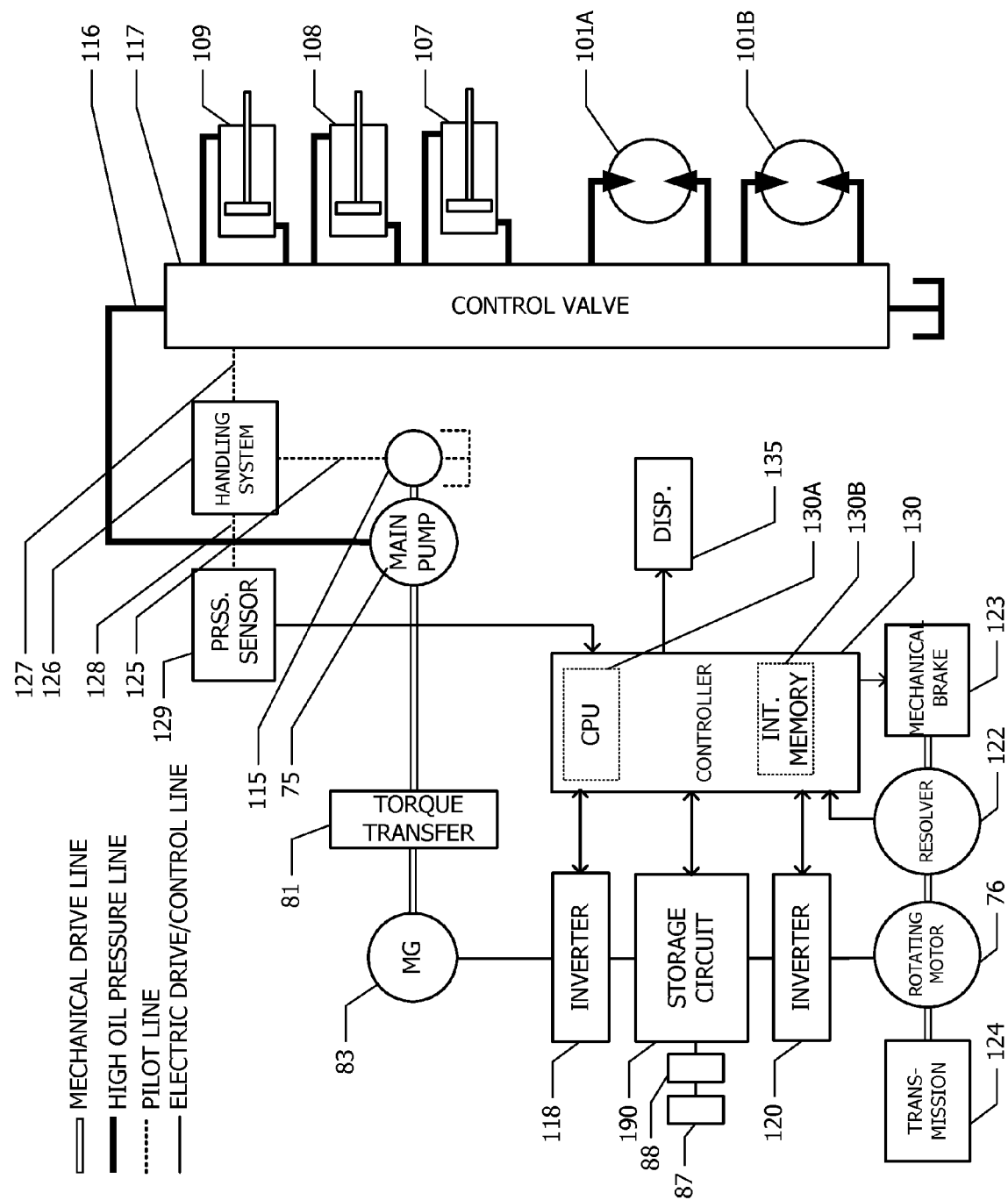
FIG. 27 is a block diagram of a hybrid shovel according to Modification 2 of Embodiment 8.

FIG. 27 shows a block diagram of a shovel according to Modification 2 of Embodiment 8. In the following, attention will be paid to differences from the hybrid shovel according to Embodiment 8 shown in FIG. 25, and description of the same configuration will be omitted.

In the shovel according to Modification 2 of Embodiment 8, the engine 74 (FIGS. 22 and 25) is not mounted. A voltage converter 88 and an external power source connecting plug 87 for charging the electricity storage module 80 are prepared. The electricity storage module 80 can be charged via the external power source connecting plug 87 and the voltage converter 88 from an external power source. The motor generator 83 does not operate as a generator, and operates only as an electric motor by the electric power supplied from the electricity storage module 80 (electricity storage circuit 190).

The voltage converter 88 performs voltage conversion for adapting the voltage of the external power source to the voltage of the electricity storage module 80.

The electricity storage modules according to Embodiments 1 to 7 can be applied not only to the hybrid shovel but to the electric shovel as in this modification.

The inventions shown in the following additional remarks are further disclosed on the basis of the above Embodiments 1 to 8.

(Additional Remark 1)

An electricity storage module comprising electricity storage cells each including at least a pair of electrodes lead out from the edges of a plate-like portion, the electricity storage cells being stacked in the thickness direction of the plate-like portions and being connected in series by bringing the one-side electrodes of the electricity storage cells adjacent to each other in a stack direction into contact with each other, in which the electrodes of each of the electricity storage cells are attached to a position deviated closer to a dorsal surface, which is one surface, than the central position of the plate-like portion in the thickness direction, the electricity storage cells adjacent to each other in the stack direction of the electricity storage cells in a posture where the dorsal surfaces face each other or in a posture in that ventral surfaces opposite the dorsal surfaces face each other, the electrodes that electrically connect the two electricity storage cells of which the dorsal surfaces are made to face each other are in contact with each other at mutually facing surfaces of the electrodes, and the electrodes that electrically connect the two electricity storage cells of which the ventral surfaces are made to face each other are bent in a direction in which the electrodes approach each other and the outer surface of one electrode and the inner surface of the other electrode in contact with each other.

(Additional Remark 2)

The electricity storage module described in Additional Remark 1, in which the electrodes that electrically connect the two electricity storage cells of which the dorsal surfaces are made to face each other are bent in the stack direction.

(Additional Remark 3)

The electricity storage module described in Additional Remark 1 or 2, further including: a heat transfer plate arranged between the electricity storage cells adjacent to each other in the stack direction.

(Additional Remark 4)

The electricity storage module described in Additional Remark 3, in which when viewed from a visual line parallel to the stack direction, the heat transfer plate spreads farther to the outside than the edge of the electricity storage cell in a direction different from the direction in which the electrodes are led out.

(Additional Remark 5)

The electricity storage module described in any one of Additional Remarks 1 to 4, further includes a housing that pressurizes and accommodates the plurality of electricity storage cells in the stack direction.

(Additional Remark 6)

An electricity storage module including a plurality of plate-like electricity storage cells each including an electricity storage container that accommodates an electricity storage stack and a pair of lead-out electrodes that lead out from the edges of the electricity storage container, and overlap each other in a posture where the lead-out directions of the lead-out electrodes faces the same direction, and a fixing member that has one lead-out electrode of one of the two electricity storage cells adjacent to each other and one lead-out electrode of the other electricity storage cell inserted thereinto in a state where the electricity storage cells overlap each other and that constrains the relative positional relationship of the two inserted lead-out electrodes in a direction orthogonal to a virtual plane orthogonal to the overlap direction of the electricity storage cells and the lead-out direction of the lead-out electrodes.

(Additional Remark 7)

The electricity storage module described in Additional Remark 6, in which the fixing member is formed from an insulating material.

(Additional Remark 8)

The electricity storage module described in Additional Remark 6 or 7, in which the two lead-out electrodes inserted into the fixing member have tip portions bent toward the stack direction of the electricity storage cells after being led out from the electricity storage container, the tip portions of the two lead-out electrodes inserted into the fixing member overlap each other, and the fixing member has an opening that has the two lead-out electrodes are inserted thereinto and exposes both surfaces of the mutually overlapped tip portions.

(Additional Remark 9)

The electricity storage module described in Additional Remark 8, in which a side surface of the opening is formed with a step that regulates the insertion depth of the lead-out electrodes into the opening as the bending positions of the lead-out electrodes bump against the step.

(Additional Remark 10)

The electricity storage module described in any one of Additional Remarks 6 to 9 further including a cladding film that covers each of the electricity storage cells, wherein the fixing member is formed with a groove into which the edges of the cladding film are inserted.

(Additional Remark 11)

The electricity storage module described in any one of Additional Remarks 6 to 10, further including another fixing member that has one lead-out electrode of each of two other electricity storage cells, which are stacked on one of the two electricity storage cells that have the lead-out electrodes inserted into the fixing member, inserted thereinto, and has the same geometric shape as the fixing member, in which the fixing member and the other separate fixing member have fitting portions that fit to each other, thereby constraining the relative positions of the two fixing members in a direction orthogonal to the virtual plane.

(Additional Remark 12)

An operating machine mounted with an electricity storage module including a plurality of plate-like electricity storage cells each including an electricity storage container that accommodates an electricity storage stack and a pair of lead-out electrodes that lead out from the edges of the electricity storage container, and overlap each other in a posture where the lead-out directions of the lead-out electrodes face the same direction, and a fixing member that has one lead-out electrode of one of the two electricity storage cells adjacent to each other and one lead-out electrode of the other electricity storage cell inserted thereinto in a state where the electricity storage cells overlap each other and that prohibits the relative positional movement of the two inserted lead-out electrodes in a direction orthogonal to a virtual plane orthogonal to the overlap direction of the electricity storage cells and the lead-out direction of the lead-out electrodes.

(Additional Remark 13)

A method of producing an electricity storage module including a step of preparing two plate-like electricity storage cells each including an electricity storage container that accommodates an electricity storage stack and a pair of lead-out electrodes that lead out from the edges of the electricity storage container; a step of inserting one lead-out electrode of one of the two electricity storage cells and one lead-out electrode of the other electricity storage cell into an opening of a fixing member, and constraining the relative positional relationship of the two lead-out electrodes inserted into the opening, in a direction orthogonal to the insertion direction of the lead-out electrodes and parallel to the in-plane direction of the plate-like electricity storage cell; and a step of anchoring the two lead-out electrodes to each other in a state where the relative positional relationship of the two lead-out electrodes are constrained.

REFERENCE SIGNS LIST

10: ELECTRICITY STORAGE CONTAINER
10A, 10B: LAMINATE FILM
11: ELECTRICITY STORAGE ELEMENT
12: FIRST ELECTRODE
13: SECOND ELECTRODE
14: BLEED HOLE
15: BLEED VALVE
16: PLATE-LIKE PORTION
18: ANTISTATIC FILM
20: ELECTRICITY STORAGE CELL
21: FIRST COLLECTOR ELECTRODE
21A: EXTENSION PORTION
22: SECOND COLLECTOR ELECTRODE
22A: EXTENSION PORTION
23: SEPARATOR
25: HEAT TRANSFER PLATE
27: FIRST POLARIZABLE ELECTRODE
28: SECOND POLARIZABLE ELECTRODE
31, 32, 33, 34: WALL PLATE
33A, 34A: WINDOW
40: PRESSURIZING MECHANISM
41: RETAINER PLATE
42: NUT
43: TIE-ROD
48, 49: FORCED AIR COOLING DEVICE
70: UPPER ROTATING BODY
71: LOWER TRAVELING BODY (BASE)
73: ROTATING BEARING
74: ENGINE
75: MAIN PUMP
76: ROTATING MOTOR
77: OIL TANK
78: COOLING FAN
79: SEAT
80: ELECTRICITY STORAGE MODULE
81: TORQUE TRANSFER MECHANISM
82: BOOM
83: MOTOR GENERATOR
85: ARM
86: BUCKET
87: EXTERNAL POWER SOURCE CONNECTING PLUG
88: VOLTAGE CONVERTER
90: ELECTRICITY STORAGE MODULE MOUNT
91: DAMPER (ANTI-VIBRATION DEVICE)
101A, 101B: HYDRAULIC MOTOR
107: BOOM CYLINDER
108: ARM CYLINDER
109: BUCKET CYLINDER
114: MAIN PUMP
115: PILOT PUMP
116: HIGH OIL PRESSURE LINE
117: CONTROL VALVE
118: INVERTER
119: CAPACITOR
120: INVERTER
122: RESOLVER
124: SPEED REDUCER
125: PILOT LINE
126: HANDLING SYSTEM
127, 128: OIL PRESSURE LINE
130: CONTROLLER
135: DISPLAY DEVICE
136: TEMPERATURE DETECTOR
140B: SECOND FIXING MEMBER
141: OPENING
142: FIRST SIDE SURFACE
143: SECOND SIDE SURFACE
144: STEP
145: PROTRUSION
146: RECESS
147: FITTING PORTION
148: GROOVE
149: THIRD SIDE SURFACE
150: FRONT SURFACE
151: BACK SURFACE
152: BOTTOM SURFACE
153: TOP SURFACE
160: ELECTRICITY STORAGE CELL
161: ELECTRICITY STORAGE STACK
162: ELECTRICITY STORAGE CONTAINER
163, 164: LEAD-OUT ELECTRODE
163A, 164A: TIP PORTION
165: DORSAL SURFACE
166: VENTRAL SURFACE
169: HEAT TRANSFER PLATE
170: ANVIL
171: ULTRASONIC HORN
175: TEMPORARY STORAGE CASE
176, 177: END PLATE
178: TIE-ROD
180: LOWER GUIDE
181: UPPER GUIDE
182, 183: SIDE GUIDE
185: CLADDING FILM
200: CONVERTER
201: REACTOR
202A: STEP-UP IGBT
202B: STEP-DOWN IGBT
202A, 202B: DIODE
203A, 203B: POWER SOURCE CONNECTING TERMINAL
204A, A 204B: OUTPUT TERMINAL
205: SMOOTHING CAPACITOR
206: VOLTMETER
207: AMMETER
211: VOLTMETER

The invention claimed is:

1. A shovel comprising:
a lower traveling body;
an upper rotating body rotatably attached to the lower traveling body; and
an electricity storage module mounted on the upper rotating body, wherein the electricity storage module includes a plurality of electricity storage cells each having at least a pair of electrodes led out from edges of a plate-like portion in a first direction, wherein the electricity storage cells are stacked in a thickness direction of the plate-like portions, and are connected in series by bringing the electrodes of the electricity storage cells adjacent to each other in a stack direction into contact with each other, wherein the electrodes of each of the electricity storage cells are attached to the plate-like portion at a position deviated closer to a dorsal surface, which is one surface, than the central position of the plate-like portion in the thickness direction, wherein the electricity storage cells adjacent to each other are arranged in the stack direction of the electricity storage cells in a posture where the dorsal surfaces face each other or in a posture where ventral surfaces opposite the dorsal surfaces face each other, and wherein the electrodes that electrically connect the two electricity storage cells of which the dorsal surfaces face each other are in contact with each other at mutually facing surfaces of the electrodes.

2. The shovel according to claim 1,
wherein the electrodes that electrically connect the two electricity storage cells of which ventral surfaces opposite the dorsal surfaces face each other have a bridge structure having the electrodes bent in a direction in which the electrodes approach each other and also having the outer surface of one electrode and the inner surface of the other electrode in contact with each other.

3. The shovel according to claim 1, wherein the electrodes that electrically connect the two electricity storage cells of which the dorsal surfaces face each other have an L-shaped structure that is bent in the stack direction.

4. The shovel according to claim 1, further comprising: a heat transfer plate arranged between the electricity storage cells.

5. The shovel according to claim 4, wherein when viewed from a direction parallel to the stack direction, the heat transfer plate spreads farther to the outside than the edge of the electricity storage cell in a direction different from the direction in which the electrodes are led out.

6. The shovel according to claim 1, further comprising:
a housing that pressurizes and accommodates the plurality of electricity storage cells in the stack direction.

7. The shovel according to claim 1, further comprising:
a fixing member, into which the electrodes in contact with each other are inserted, constraining a relative positional relationship of the two inserted electrodes in a direction orthogonal to a virtual plane parallel to both the stack direction of the electricity storage cells and the lead-out direction of the electrodes.

8. The shovel according to claim 7, wherein the fixing member is formed from an insulating material.

9. The shovel according to claim 7, wherein the two electrodes inserted into the fixing member include tip portions bent toward the stack direction of the electricity storage cells after being led out from the edges of the plate-like portion, wherein the tip portions of the two electrodes inserted into the fixing member overlap each other, and wherein the fixing member has an opening into which the two electrodes are inserted, the opening exposing the outer surface of the mutually overlapping tip portions.

10. The shovel according to claim 9, wherein a side surface of the opening is formed with a step that regulates the insertion depth of the electrodes into the opening as the bending positions of the electrodes get into touch with the step.

11. The shovel according to claim 7, further comprising:
a cladding film that covers each of the electricity storage cells, wherein the fixing member is formed with a groove into which the edges of the cladding film are inserted.

12. The shovel according to claim 7, further comprising:
another fixing member into which one electrode of each of other two electricity storage cells is inserted, the other two electricity storage cells being stacked on one of the two electricity storage cells that have the electrodes inserted into the fixing member, and said another fixing member having the same geometric shape as the fixing member, wherein the fixing member and said another fixing member have fitting portions that fit to each other, thereby constraining the relative positions of the two fixing members in the direction orthogonal to the virtual plane.

* * * * *